(12) United States Patent
Winterstein et al.

(10) Patent No.: US 11,270,524 B2
(45) Date of Patent: Mar. 8, 2022

(54) COMPUTER SYSTEM AND METHOD FOR DOCUMENTING ITEMS IDENTIFIED WHILE AT A CONSTRUCTION SITE

(71) Applicant: Procore Technologies, Inc., Carpinteria, CA (US)

(72) Inventors: Florian Winterstein, Rolling Hills Est, CA (US); Raf Colasante, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 105 days.

(21) Appl. No.: 16/781,389

(22) Filed: Feb. 4, 2020

(65) Prior Publication Data
US 2021/0240987 A1 Aug. 5, 2021

(51) Int. Cl.
| | | |
|---|---|---|
| G06K 9/00 | (2006.01) |
| G06V 20/20 | (2022.01) |
| G06T 7/00 | (2017.01) |
| G10L 15/26 | (2006.01) |
| G06F 40/205 | (2020.01) |
| G06F 40/295 | (2020.01) |
| G06V 20/00 | (2022.01) |

(52) U.S. Cl.
CPC ............ *G06V 20/20* (2022.01); *G06F 40/205* (2020.01); *G06F 40/295* (2020.01); *G06T 7/0004* (2013.01); *G06V 20/35* (2022.01); *G10L 15/26* (2013.01)

(58) Field of Classification Search
CPC ............ G06K 9/00671; G06K 9/00684; G06T 7/0004; G10L 15/26; G06F 40/205; G06F 40/295; G06F 40/20

USPC .......................... 382/141; 704/276, E17.024
See application file for complete search history.

(56) References Cited

U.S. PATENT DOCUMENTS

| | | |
|---|---|---|
| 2005/0246283 A1 | 11/2005 | Gwiazda et al. |
| 2007/0136300 A1 | 6/2007 | Chien et al. |
| | (Continued) | |

FOREIGN PATENT DOCUMENTS

| | | |
|---|---|---|
| JP | 2017228034 A | 12/2017 |
| KR | 1020110049296 A | 5/2011 |

OTHER PUBLICATIONS

Procore, "Procore Punch List Interactive Workflow Diagram," retrieved from the internet: https://support.procore.com/products/online/user-guide/project-level/punch-list, Nov. 7, 2018, 25 pages.

(Continued)

*Primary Examiner* — Charlotte M Baker
(74) *Attorney, Agent, or Firm* — Lee Sullivan Shea & Smith LLP

(57) ABSTRACT

In order to improve a user's task of documenting items that are identified by the user while at a construction site, a computing system may be configured to (i) analyze media content captured at a construction site (e.g., an audio or audiovisual recording) that is descriptive of at least one given on-site item identified by a user while at the construction site, (ii) extract, from the captured media content, a set of information for the given on-site item, (iii) based on the extracted set of information for the given on-site item, generate a data record for the given on-site item, and (iv) cause the generated data record for the given on-site item to be presented to the user for review.

20 Claims, 8 Drawing Sheets

(56) References Cited

U.S. PATENT DOCUMENTS

2012/0047420 A1 2/2012 Gaffey et al.
2021/0037296 A1* 2/2021 O'Daniel ............ G01N 33/383

OTHER PUBLICATIONS

International Searching Authority, International Search Report and Written Opinion, PCT/US2021/016262, dated May 26, 2021, 10 pages.

* cited by examiner

COMPUTER SYSTEM AND METHOD FOR DOCUMENTING ITEMS IDENTIFIED WHILE AT A CONSTRUCTION SITE

BACKGROUND

A construction project is a typically complex, multi-phase endeavor that involves coordination and management of many different companies and individuals that are performing work at a construction site (or perhaps multiple different construction sites). One aspect of managing a construction project involves tasking one or more individuals with the responsibility of identifying and documenting certain items of interest at a construction site, which may be referred to herein as "on-site items." These on-site items may take various forms.

For instance, one type of on-site item that may be identified and documented by an individual at a construction site may be an "unfinished-work item," which is a work activity that needs to be completed at the construction site. Another type of on-site item that may be identified and documented by an individual at a construction site may be a "quality item," which is an observed aspect of the construction site that does not meet quality standards, such as a work activity that has not been completed in a satisfactory manner, a piece of material that is flawed or defective, or a piece of equipment at the construction site that is not functioning properly, among other possibilities. Yet another type of on-site item that may be identified and documented by an individual at a construction site may be a "safety item," which is an observed aspect of the construction site that does not meet safety standards, such as unsafe behavior that is observed at the construction site (e.g. a worker failing to wear a hardhat), an unsafe condition that is observed at the construction site (e.g., exposed rebar), or a discrete safety incident that has occurred at the construction site (e.g., an accident or injury), among other possibilities. Still another type of on-site item that may be identified and documented by an individual at a construction site may be a "status item," which is a status update regarding some aspect of the construction site, such as a status update regarding the delivery of materials at the construction site, the manpower available at the construction site at a particular time, the equipment available at the construction site at a particular time, and/or events of interest that have occurred at the construction site, among other possibilities. There may also be other types of on-site items that are identified and documented by individuals at a construction site as well, including but not limited to a change event that will potentially change the scope of a construction project or a request for inspection (RFI) item that seeks resolution to a question that has come up during the course of a construction project.

The foregoing types of on-site items may also be classified in various different ways depending on the nature of the on-site items and perhaps also depending on when such on-site items are identified during the course of the construction project. For instance, a construction project typically includes a "closure" phase that takes place immediately prior to completion of the construction project, and during that closure phase, one or more individuals are tasked with the responsibility of walking around the construction site to identify and document outstanding items that must be completed before the construction can be deemed to be "closed out," which are then compiled into a "punch list" for the construction project. In this respect, the on-site items that are identified and documented during this closure phase—which typically includes a combination of unfinished-work items and quality items—may be classified as "punch items."

Moreover, even before the closure phase of a construction project, individuals may periodically walk around a construction site to monitor for certain types of on-site items that should be documented. For example, at some point prior to the closure phase (e.g., during a "monitoring" phase), an individual could be tasked with the responsibility of inspecting the construction site for purposes of identifying and documenting unfinished-work items, quality items, and/or safety items that can be observed at the construction site. In this respect, the on-site items that are identified and documented during such a pre-closure inspection of the construction site may be classified as "observation items" and/or "task items" (opposed to punch items).

As another example, one or more individuals involved in a construction project may specifically be tasked with documenting discrete safety incidents that occur at a construction site throughout the course of the construction project. In this respect, the safety incidents that are identified and documented by such an individual may be classified as "incident items" (although it should be understood that these discrete safety incidents could also be classified as "observation items").

As yet another example, one or more individuals involved in a construction project may specifically be tasked with maintain a daily log of status items for a construction site, such as a status item for material deliveries each day, a status item for the manpower available at the construction site each day, a status item for the equipment available at the construction site each day, a status item for any other interesting events that occur each day, among other possibilities. In this respect, the status items that are identified and documented by such an individual may be classified as "daily-log items."

The on-site items identified at a construction site may be classified in various other manners as well.

OVERVIEW

Conventionally, on-site items identified by an individual while at a construction site were documented in a handwritten report (e.g., a handwritten punch list of the like), which was then distributed and managed in hard copy form. This approach gave rise to several efficiency issues, including difficulties and delays associated with creating a handwritten report of on-site items while at a construction site as well as difficulties and delays distributing and managing the hard copy of the handwritten report across the various individuals that were responsible for tracking and/or taking further action with respect to the on-site items documented in the report (e.g., individuals responsible for completing punch items).

More recently, software technology has become available that allows on-site items identified by an individual while at a construction site to be documented electronically. For example, Procore Technologies, Inc. ("Procore"), which is the assignee of the present application, offers a construction management software-as-a-service ("SaaS") application comprising various different software tools that can be used to electronically document on-site items identified by a user while at a construction site, including but not limited to a "Punch List" tool for documenting and managing punch items, an "Observations" tool for documenting and managing observation items, an "Incidents" tool for documenting and managing incident items, a "Daily Log" tool for documenting and managing daily-log items, and a "Task" tool for documenting and managing task items, among others. Further details regarding the functionality of an example "Punch List" tool are set forth in U.S. patent application Ser. Nos. 16/129,147 and 16/183,703, each of which is incorporated herein in its entirety.

While software tools such as these have significantly improved a user's ability to document and manage on-site items that are identified by the user while at a construction site, problems may still arise when attempting to document on-site items while at a construction project using such software tools. Indeed, the task of documenting on-site items while at a construction site often takes place in a stressful, high-pressure environment in which a user typically has a limited amount of time to walk through the construction site and memorialize the necessary information about each on-site item identified at the construction site, all while navigating around and potentially being interrupted by other individuals working at the construction site. However, at the same time, manually entering the necessary information about each on-site item identified while at a construction site into a software tool can be very time consuming—particularly when there are tens or hundreds of on-site items that need to be documented while at the construction site. As such, there is a need for software technology that allows users to document on-site items identified while at a construction site in a faster, more usable and/or more efficient way.

In view of the foregoing, disclosed herein is software technology that improves a user's task of documenting items that are identified by the user while at a construction site, such as unfinished-work items, quality items, safety items, and/or status items. At a high level, the disclosed software technology may comprise (i) a first software component that facilitates a user's capture of media content that is descriptive of on-site items identified by the user while at a construction site, (ii) a second software component that facilitates functions of extracting a respective set of information from the captured media content for each of the on-site items identified by the user at the construction site and then automatically generating a respective data record for each on-site item identified by the user at the construction site based on this extracted information, and (iii) a third software component that facilitates a user's ability to review, edit, and/or approve the automatically-generated data records (among various other functions that may be carried out by devices executing the software components disclosed herein).

In this way, the disclosed software technology may advantageously allow a user to document on-site items identified by the user while at a construction site by capturing media content that is descriptive of the on-site items (e.g., audio and/or audiovisual recordings) on the user's client station rather than requiring the user to manually enter the necessary information about each on-site item identified at a construction site into the user's client station via a keyboard, a touch screen, or the like, which may improve upon the usability and efficiency of existing software tools for documenting on-site items identified by a user while at a construction site. For instance, by using the disclosed software technology, a user may be able to more seamlessly document on-site items while at a construction site by recording audio of the user's verbal description of the on-site items and/or video of the on-site items and then relying on the disclosed software technology to extract the relevant information from the recorded audio and/or video and automatically populate such information into generated data records for the on-site items, which can subsequently be reviewed, edited, and/or approved by the user. The disclosed software technology may provide other improvements over existing software tools for documenting on-site items identified by a user while at a construction site as well.

Accordingly, in one aspect, disclosed herein is a computer-implemented method that involves (i) analyzing media content captured at a construction site (e.g., an audio or audiovisual recording) that is descriptive of at least one given on-site item identified by a user while at the construction site, (ii) extracting, from the captured media content, a set of information for the given on-site item, (iii) based on the extracted set of information for the given on-site item, generating a data record for the given on-site item, and (iv) causing the generated data record for the given on-site item to be presented to the user for review.

In example embodiments, the aforementioned method may additionally involve (v) after causing the generated data record for the given on-site item to be presented to the user for review, receiving user input related to the generated data record (e.g., a requested edit to the generated data record and/or an indication that the user has approved the generated data record) and then (iv) updating the generated data record in accordance with the received user input.

Further, in example embodiments, the function of analyzing the captured media content may comprise (a) translating the captured media content into text that describes the given on-site item, which may involve the use of speech recognition to transcribe audio data included in the captured media content into text that describes the given on-site item and/or image recognition to identify objects within video data included in the captured media content and then generating text that describes the identified objects, among other possibilities, and then (b) performing an analysis of the text translation, which may involve the use of natural language processing (NLP) techniques such as dependency parsing, text summarization, name recognition, and/or text classification, among other possibilities.

Further yet, in example embodiments, the extracted set of information for the given on-site item may include a description of the given on-site item, a title of the given on-site item, a categorization of the given on-site item, an individual responsible for the given on-site item, and/or a location of the given on-site item, among other possibilities.

Still further, in example embodiments, the function of causing the generated data record for the given on-site item to be presented to the user for review may comprise transmitting the generated data record to a client station (e.g., the client station used to capture the media content or some other client station) via a communication network and thereby causing the client station to present the generated data record to the user.

In another aspect, disclosed herein is a computing system comprising a communication interface, at least one processor, a non-transitory computer-readable medium, and program instructions stored on the non-transitory computer-readable medium that are executable by the at least one processor such that the computing system is capable of carrying out the aforementioned functions.

In yet another aspect, disclosed herein is a non-transitory computer-readable medium provisioned with program instructions that are executable by at least one processor of a computing system such that the computing system is capable of carrying out the aforementioned functions.

One of ordinary skill in the art will appreciate these as well as numerous other aspects in reading the following disclosure.

DETAILED DESCRIPTION

Figure 1:
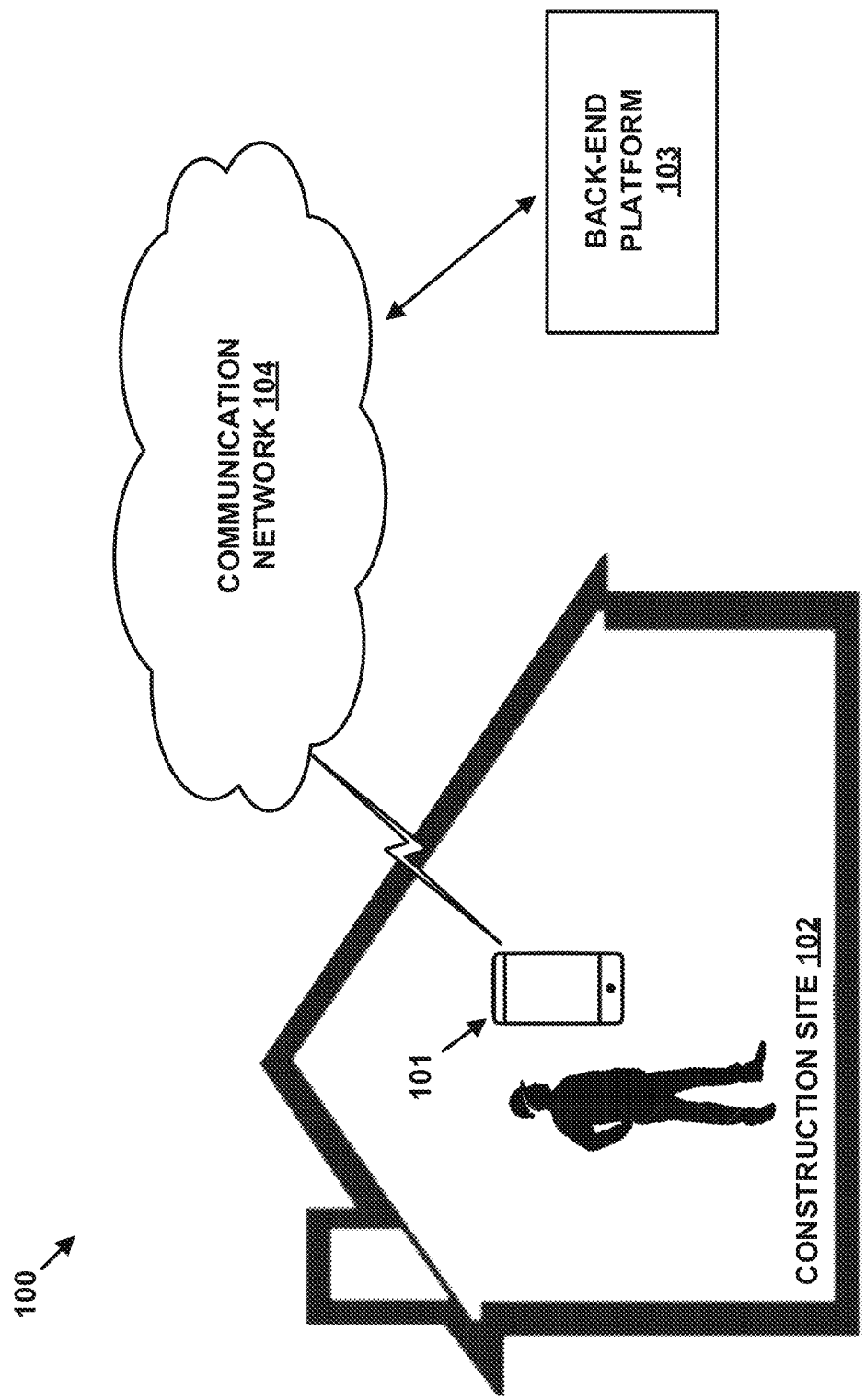
FIG. 1 depicts an example network configuration in which example embodiments of the disclosed software technology may be implemented.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As discussed above, disclosed herein is software technology that improves a user's task of documenting items that are identified by the user while at a construction site, such as unfinished-work items, quality items, safety items, and/or status items. At a high level, the disclosed software technology may comprise (i) a first software component that facilitates a user's capture of media content that is descriptive of on-site items identified by the user while at a construction site (which may be referred to herein as the "capture" software component), (ii) a second software component that facilitates functions of extracting a respective set of information from the captured media content for each of the on-site items identified by the user at the construction site and then automatically generating a respective data record for each on-site item identified by the user at the construction site based on this extracted information (which may be referred to herein as the "processing" software component), and (iii) a third software component that facilitates the user's ability to review, edit, and/or approve the automatically-generated data records (which may be referred to herein as the "review" software component). These software components may be embodied in various manners.

In one implementation, the disclosed software technology may be embodied in the form of a SaaS application in which the capture and review software components disclosed herein are to be run on a client station of a user (which could either be the same client station or different client stations), the processing software component is to be run on a back-end platform that is accessible to the user's client station(s) via a communication network such as the Internet, and the user's client station(s) and the back-end platform may collectively carry out the disclosed functions for documenting items identified by a user while at a construction site. As one possible example of such an implementation, the disclosed software technology could be integrated into Procore's construction management SaaS application, either as a standalone software tool or as an update to Procore's existing software tools for documenting on-site items identified by a user while at a construction site. A SaaS application that integrates the disclosed software technology may take various other forms as well.

In another implementation, the software technology disclosed herein could be embodied in the form of a single, native application to be installed on a client station of a user that comprises each of the capture, processing, and review software components disclosed herein, in which case a user's client station may be configured to carry out the disclosed functions for documenting items identified by the user while at a construction site with little or no interaction with a back-end platform. (In this respect, it should be understood that the different software components could be implemented either as separate sets of executable program instructions or as a single, integrated set of executable program instructions).

Other implementations of the disclosed software technology are possible as well.

I. EXAMPLE SYSTEM CONFIGURATION

Turning now to the figures, FIG. 1 depicts one possible example of a simplified network configuration 100 in which example embodiments of the present disclosure may be implemented. As shown in FIG. 1, example network configuration 100 includes a representative client station 101 that is located at a construction site 102 and is communicatively coupled to a back-end platform 103 via a communication network 104. However, it should be understood that network configuration 100 may take various other forms and include various other computing entities as well, including but not limited to other client stations (e.g., another client station that may be capable of accessing data records from back-end platform 103).

Client station 101 may generally comprise any computing device that is capable of running at least the capture and review software components of the disclosed software technology for documenting items that are identified by a user while at construction site 102 (and perhaps also the processing software component of the disclosed software technology). For instance, client station 101 may take the form of a smartphone, a tablet, a laptop, a netbook, a desktop computer, a personal digital assistant (PDA), and/or a wearable headset (e.g., smart glasses), among other possibilities. An example client station is discussed in further detail below with reference to FIG. 2.

In turn, back-end platform 103 may generally comprise one or more computing systems that are capable of running at least the processing software component of the disclosed software technology for documenting items that are identified by a user while at construction site 102 (perhaps among other various other software components associated with providing a SaaS application for construction management). These one or more computing systems may take various forms and be arranged in various manners.

For instance, as one possibility, back-end platform 103 may comprise computing infrastructure of a public, private, and/or hybrid cloud (e.g., computing and/or storage clusters) that has been provisioned with the disclosed processing software component. In this respect, the entity that owns and operates back-end platform 103 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, back-end platform 103 may comprise one or more dedicated servers that have been provisioned with the disclosed processing software component. Other implementations of back-end platform 103 are possible as well, and an example platform is discussed in further detail below with reference to FIG. 3.

As noted, client station 101 may be communicatively coupled to back-end platform 103 via communication network 104, which may take various forms. For instance, at a high level, communication network 104 may include one or more Wide-Area Networks (WANs) (e.g., the Internet and/or a cellular network), Local-Area Networks (LANs), Personal Area Networks (PANs), and/or cloud networks, where each such network which may be wired and/or wireless and may carry data according to any of various different communication protocols. Further, it should be understood that the communications path between client station 101 and back-end platform 103 may take other forms as well, including the possibility that the communication path may include communication links (e.g., a point-to-point link) and/or intermediate devices that are not shown. Many other configurations are also possible.

Although not shown in FIG. 1, back-end platform 103 may also be configured to receive data from one or more external data sources that may be used to facilitate functions related to the disclosed process. A given external data source—and the data output by such data sources—may take various forms.

It should be understood that network configuration 100 is one example of a simplified network configuration in which example embodiments described herein may be implemented. Numerous other arrangements are possible and contemplated herein. For instance, other network configurations may include additional components not pictured and/or more or less of the pictured components.

II. EXAMPLE CLIENT STATION

Figure 2:
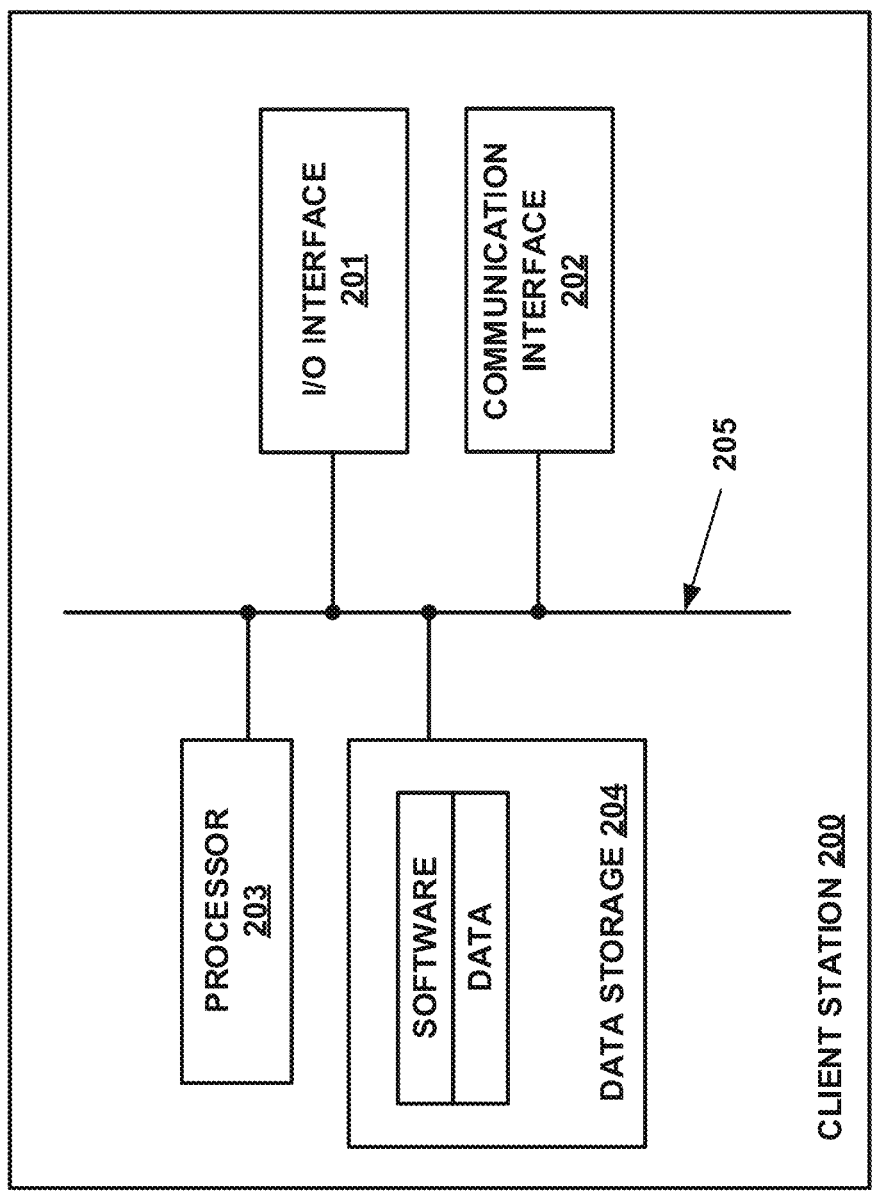
FIG. 2 depicts an example client station that may be configured to carry out one or more of the functions of the disclosed software technology.

FIG. 2 is a simplified block diagram illustrating some structural components that may be included in an example client station 200, which could serve as client station 101 of FIG. 1. In line with the discussion above, client station 200 may generally comprise an I/O interface 201, a communication interface 202, a processor 203, and data storage 204, all of which may be communicatively linked by a communication link 205 that may take the form of a system bus or the like.

I/O interface 201 may generally take the form of (i) one or more input interfaces that are configured to receive and/or capture information at client station 200 and (ii) one or more output interfaces that are configured to output information from client station 200 (e.g., for presentation to a user). In this respect, the one or more input interfaces of I/O interface 201 may include or provide connectivity to input components such as a microphone, a camera, a keyboard, a mouse, a trackpad, a touchscreen, and/or a stylus, among other possibilities. In turn, the one or more output interfaces of I/O interface 201 may include or provide connectivity to output components such as a display screen and/or an audio speaker, among other possibilities.

Communication interface 202 may take the form of any one or more interfaces that facilitate communication between client station 200 and other computing entities, such as a remote computing platform (e.g., back-end platform 103 of FIG. 1) and/or other client stations. In this respect, each such interface may be wired and/or wireless and may communicate according to any of various communication protocols, examples of which may include Ethernet, Wi-Fi, cellular network, serial bus (e.g., Universal Serial Bus (USB) or Firewire), and/or short-range wireless protocols, among other possibilities.

Processor 203 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, data storage 204 may comprise one or more non-transitory computer-readable storage mediums that are collectively configured to store (i) program instructions that are executable by processor 203 such that client station 200 is configured to perform some or all of the functions disclosed herein, and (ii) data that may be captured, received, derived, or otherwise stored by client station 200 in connection with the disclosed software technology. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc.

Although not shown, client station 200 may also include one or more components that are used to determine a location and/or orientation of client station 200. Such components may take various forms, examples of which include an Inertial Measurement Unit (IMU) (which may be comprised of accelerometers, gyroscopes, and/or magnetometers) and/or a Global Navigation Satellite System (GNSS) unit such as a Global Positioning System (GPS) receiver, among other possibilities.

It should be understood that client station 200 is one example of a client station that may be used with the example embodiments described herein. Numerous other arrangements are possible and contemplated herein. For instance, other client stations may include additional components not pictured and/or more or less of the pictured components.

III. EXAMPLE PLATFORM

Figure 3:
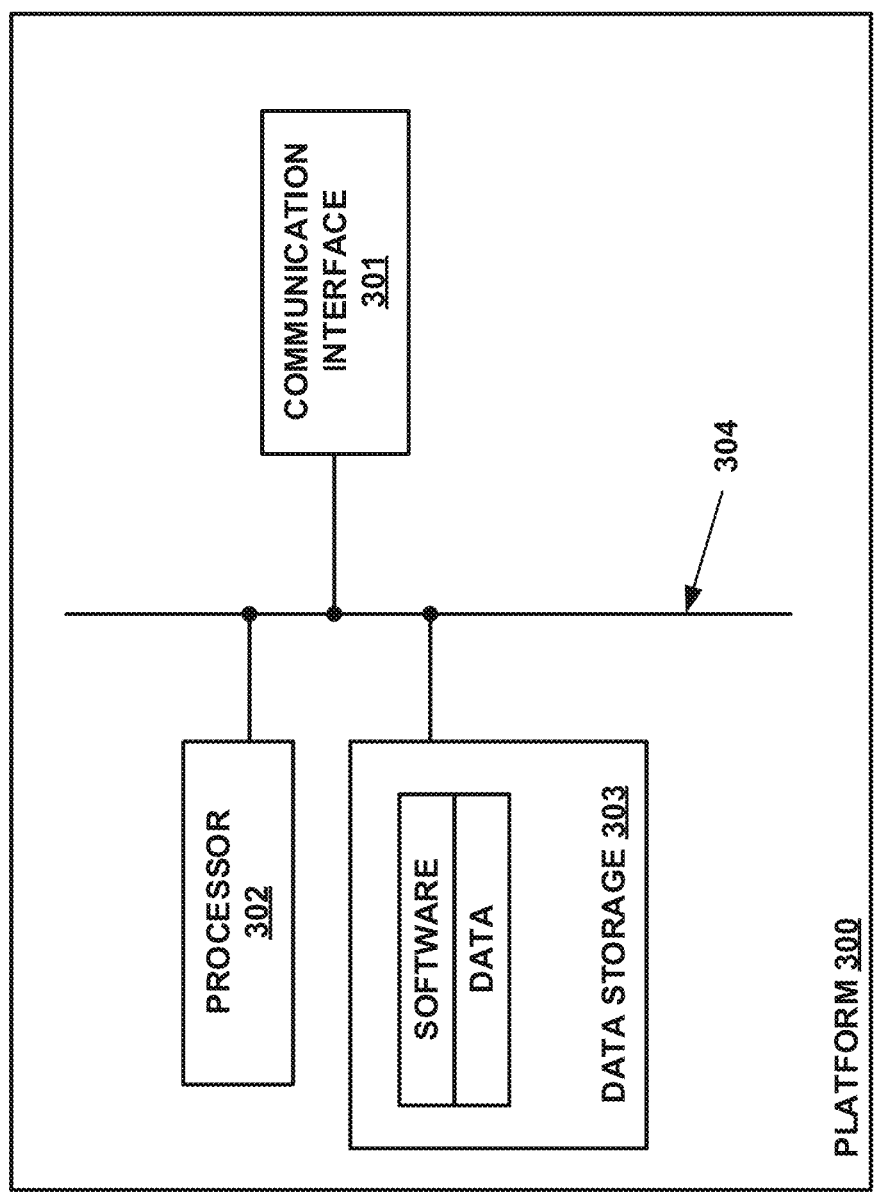
FIG. 3 depicts an example computing platform that may be configured to carry out one or more of the functions of the disclosed software technology.

FIG. 3 is a simplified block diagram illustrating some structural components that may be included in an example computing platform 300, which could serve as back-end platform 103 of FIG. 1. In line with the discussion above, platform 300 may generally comprise one or more computer systems (e.g., one or more servers), and these one or more computer systems may collectively include at least a communication interface 301, a processor 302, and data storage 303, all of which may be communicatively linked by a communication link 304 that may take the form of a system bus, a communication network such as a public, private, or hybrid cloud, or some other connection mechanism.

Communication interface 301 may take the form of any one or more interfaces that facilitate communication between platform 300 and other computing entities, such as client stations (e.g., client station 101 of FIG. 1), external data sources, and/or other computing platforms. In this respect, each such interface may be wired and/or wireless and may communicate according to any of various communication protocols, examples of which may include Ethernet, Wi-Fi, cellular network, serial bus (e.g., USB or Firewire), and/or short-range wireless protocols, among other possibilities. In line with the discussion above, it should also be understood that communication interface 301 could comprise interfaces that are distributed across a plurality of physical computing devices connected via a network, such as a computing cluster of a public, private, or hybrid cloud.

Processor 302 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that processor 302 could comprise processing components that are distributed across a plurality of physical computing devices connected via a network, such as a computing cluster of a public, private, or hybrid cloud.

In turn, data storage 303 may comprise one or more non-transitory computer-readable storage mediums that are collectively configured to store (i) program instructions that are executable by processor 302 such that platform 300 is configured to perform some or all of the disclosed functions, and (ii) data that may be received, derived, or otherwise stored by platform 300 in connection with the disclosed software technology. In this respect, the one or more non-transitory computer-readable storage mediums of data storage 303 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 303 may comprise computer-readable storage mediums that are distributed across a plurality of physical computing devices connected via a network, such as a storage cluster of a public, private, or hybrid cloud.

Although not shown, platform 300 may additionally include an I/O interface that is configured to receive and/or capture information at platform 300 (e.g., via a microphone, a camera, a keyboard, a mouse, a trackpad, a touchscreen, a stylus, etc.) and/or output information from platform 300 (e.g., via a display screen, audio speaker, etc.).

It should be understood that platform 300 is one example of a computing platform that may be used with the embodiments described herein. Numerous other arrangements are possible and contemplated herein. For instance, other computing platforms may include additional components not pictured and/or more or less of the pictured components.

IV. EXAMPLE FUNCTIONALITY

Figure 4:
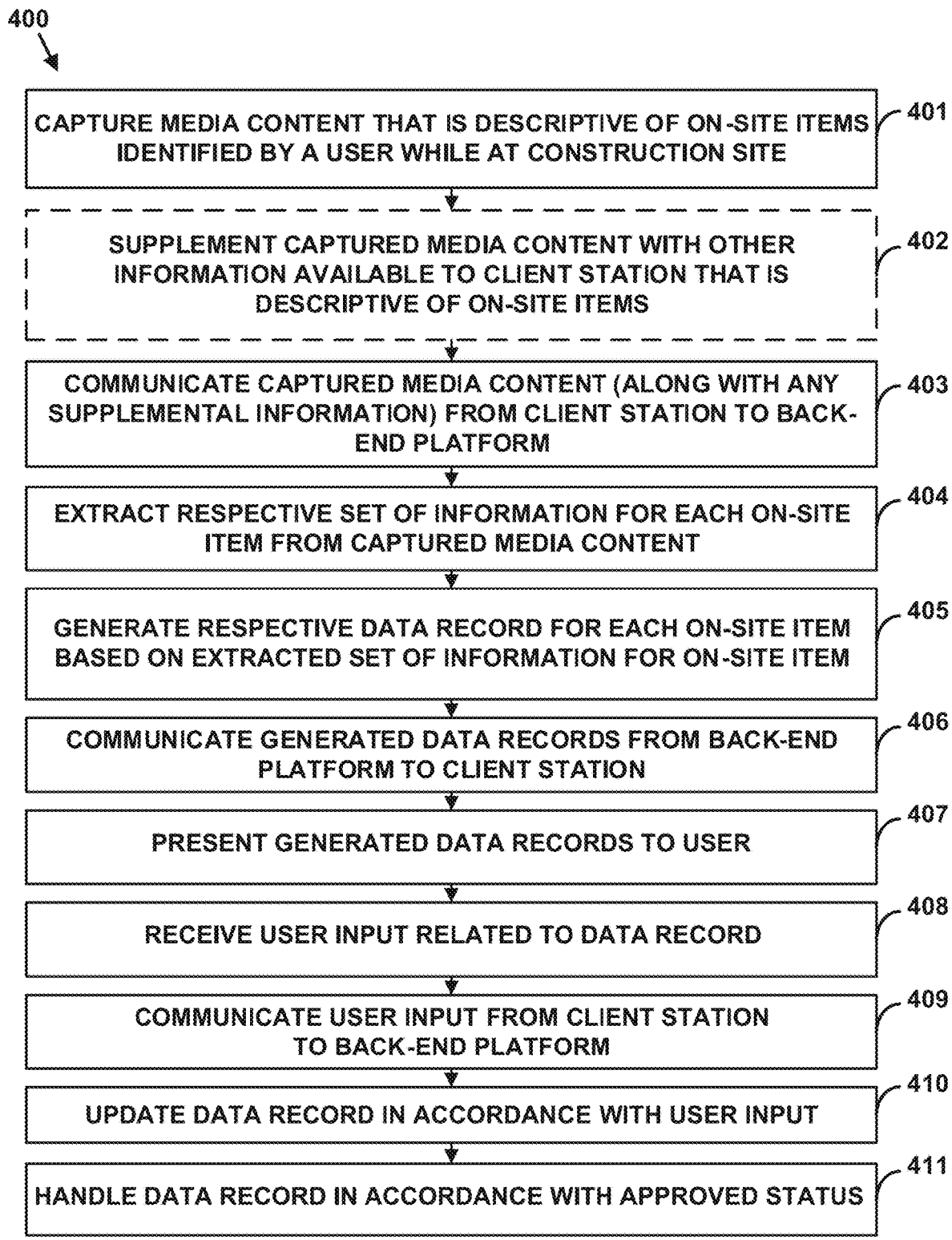
FIG. 4 depicts an example flow diagram illustrating example functions that may be carried out in accordance with one embodiment of the disclosed software technology.

Referring now to FIG. 4, a functional block diagram 400 is provided to illustrate some example functions that may be carried out by the disclosed software technology in order to improve a user's task of documenting on-site items identified by the user while at a construction site. For the purposes of illustration, the example functions are described below as being carried out by an example of the disclosed capture software component being run by client station 101 of network configuration 100, an example of the disclosed processing software component being run by back-end platform 103 of network configuration 100, and an example of the disclosed review software component being run by client station 101 of network configuration 100, but it should be understood that the example functions may be carried out in various other network configurations as well. Likewise, it should be understood that the disclosed software technology is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

In practice, the user of client station 101 may begin the task of documenting on-site items identified by the user while at construction site 102 by launching a software tool on client station 101 that incorporates the disclosed front-end software component. Such a software tool may take various forms. As some possible examples, such a software tool could take the form of a "Punch List" tool for documenting and managing punch items, an "Observations" tool for documenting and managing observation items, an "Incidents" tool for documenting and managing incident items, a "Daily Log" tool for documenting and managing daily-log items, or a "Task" tool for documenting and managing task items, any of which may be adapted to incorporate the disclosed front-end software component. However, a software tool that incorporates the disclosed front-end software component may take various other forms as well, including but not limited to the possibility that the disclosed front-end software component may be embodied as a separate "Smart Input" software tool for documenting certain on-site items.

After launching a software tool on client station 101 that incorporates the disclosed front-end software, then at block 401, the user may use client station 101 to capture media content that is descriptive of certain on-site items identified by the user while at construction site 102, such as unfinished-work items, quality items, safety items, and/or status items, among other possibilities.

In accordance with the present disclosure, client station 101 may be used to capture different types of media content that is descriptive of the identified on-site items. As one example, the user may use client station 101 to capture one or more audio recordings while the user verbally describes the on-site items identified at construction site 102. As another example, the user may use client station 101 to capture one or more audiovisual recordings while the user verbally describes the on-site items identified at construction site 102 and also points the client station's camera at certain aspects of construction site 102 that are associated with the identified on-site items. Client station 101 could be used to capture other types of media content is descriptive of the identified on-site items as well.

Further, the manner in which client station 101 captures the media content that is descriptive of the identified on-site items may also take various forms. For instance, according to a first example implementation, client station 101 may be configured to capture the media content that is descriptive of the identified on-site items on an item-by-item basis, such that client station 101 engages in a respective, discrete capture session for each different on-site item identified by the user while at construction site 102. In this first example implementation, the captured media content may then take the form of discrete, item-by-item pieces of media content (e.g., item-by-item audio or audiovisual recordings) that are each descriptive of one respective on-site item identified by the user while at construction site 102.

According to a second example implementation, client station 101 may be configured to capture the media content that is descriptive of the identified on-site items on a multi-item basis, such that client station 101 engages in a capture session for multiple different on-site items identified by the user while at construction site 102. For example, the user could use client station 101 to engage in a single capture session for the entire set of on-site items identified by the user while at construction site 102 on a given day, or the user could use client station 101 to engage in multiple capture sessions for multiple different subsets of on-site items identified by the user while at construction site 102 on a given day (e.g., different capture sessions for different areas of construction site 102 and/or different capture sessions for different types of on-site items). In this second example implementation, the captured media content may then take the form of one or more pieces of media content (e.g., one or more audio or audiovisual recordings) that are each descriptive of multiple different on-site items identified by the user while at construction site 102.

In either of the foregoing implementations, client station 101 may be configured to begin and end each respective media capture session in response to various triggering events. For instance, as one possibility, client station 101 may be configured to begin or end a media capture session in response to detecting certain user input at the client station's I/O interface, such as user input that is interpreted as an instruction to begin a new capture session (e.g., the user pressing a "Start Recording" button or verbally instructing client station 101 to "Start Recording") or user input that is interpreted as an instruction to end an active capture session (e.g., the user pressing a "Stop Recording" button or verbally instructing client station 101 to "Stop Recording"). As another possibility, client station 101 may be configured to begin or end a media capture session in response to detecting the presence or absence of verbal input by the user. For example, client station 101 may be configured to begin a new media capture session in response detecting that the user has begun providing verbal input for the first time since a last media capture session has ended and/or may be configured to end an active media capture session in response detecting that a threshold amount of time has passed since any verbal user input has been detected at the client station's I/O interface. As yet another possibility, client station 101 may be configured to end an active media capture session in response to detecting that a threshold amount of time has passed since the active media capture session began (e.g., 30 seconds in an implementation where client station 101 is configured to capture media content on an item-by-item basis). As still another possibility, client station 101 may be configured to end an active media capture session (and perhaps also contemporaneously begin a next media capture session) in response to detecting that the client station's location has changed by a threshold amount (e.g., 30 feet in an implementation where client station 101 is configured to capture media content on an item-by-item basis).

Client station 101 may be configured to begin or end a media capture session in response to other triggering events as well. Further, in some implementations, client station 101 may be configured such that, instead of beginning or ending a media capture session in response to detecting a triggering event, client station 101 may notify the user that a triggering event for beginning or ending a media capture session has been detected but may not actually begin or end the media capture session unless and until client station 101 detects a user instruction to do so. For example, if client station 101 detects triggering event for ending an active media capture session, such as by detecting that a threshold amount of time has passed since any verbal user input has been detected at the client station's I/O interface, detecting that a threshold amount of time has passed since the active media capture session began, and/or detecting that the client station's location has changed by a threshold amount, client station 101 may present the user with a notification that such a triggering event has been detected (e.g., a textual notification presented via the client station's display screen) but may then proceed with the active media capture session unless and until client station 101 detects a user instruction to end the active media capture session. Other examples are possible as well.

Notably, the foregoing implementations may have respective advantages and possible disadvantages. For instance, the first implementation may enable back-end platform 103 to separate out the captured media content on an item-by-item basis without evaluating the underlying media content, which may improve the back-end processing efficiency of the disclosed software technology, but this first implementation may also involve more user interaction during the client station's capture of the media content (e.g., user input dictating when to start and/or stop each discrete, item-specific capture session), which could potentially be viewed as a less desirable user experience by at least some users. On the other hand, the second implementation may involve less user interaction during the client station's capture of the media content, which could potentially be viewed as a more desirable user experience by at least some users, but this second implementation may then rely on client station 101 and/or back-end 103 to separate out the captured media content on an item-by-item basis based on an evaluation of the underlying media content, which may degrade the back-end efficiency (and perhaps also the accuracy) of the disclosed software technology. As such, these respective advantages and possible disadvantages may be considered and balanced when selecting between the foregoing implementations.

Figure 5:
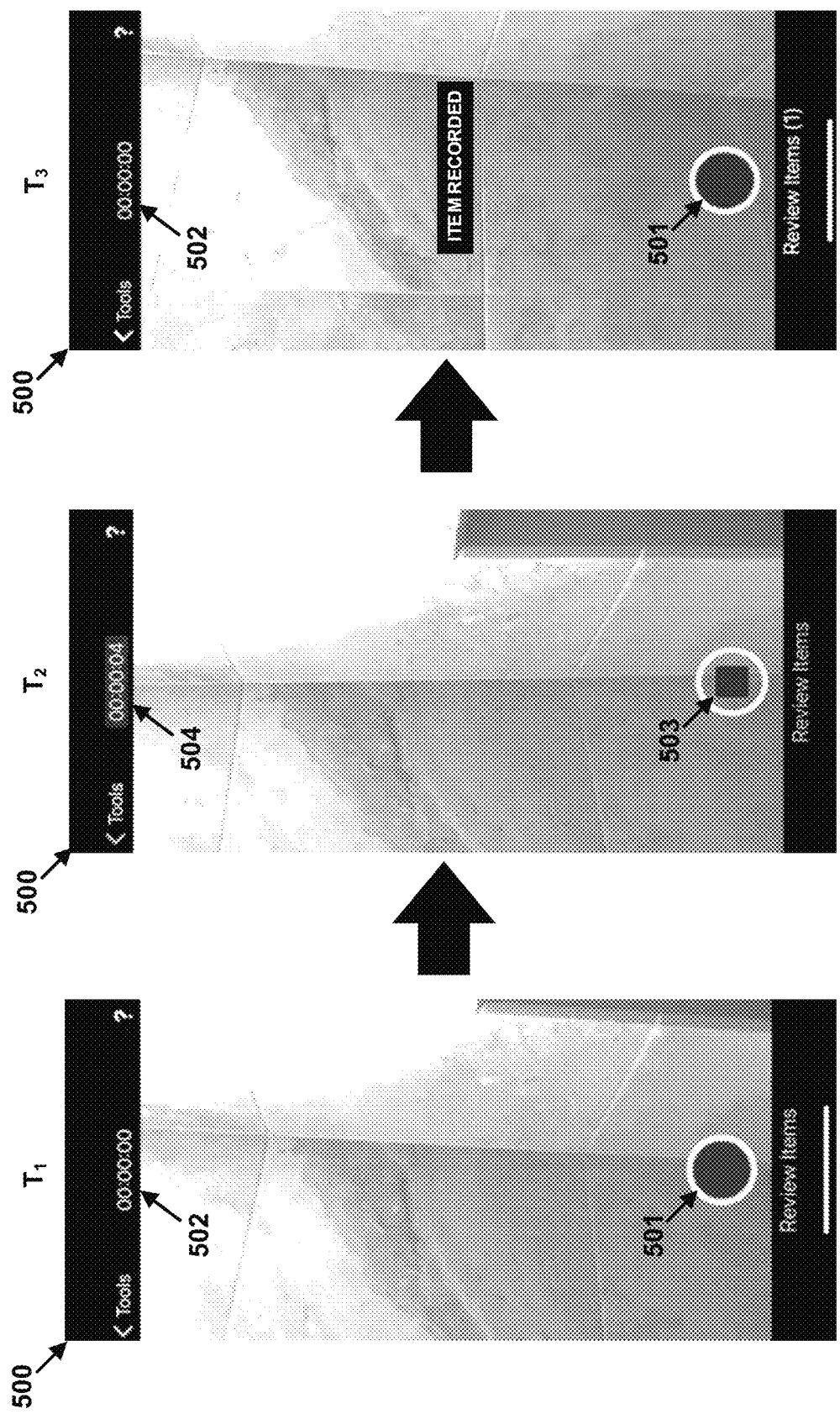
FIG. 5 depicts example user-interface views for capturing audiovisual recordings in accordance with one embodiment of the disclosed software technology.

One possible example of how client station 101 may be used to capture media content that is descriptive of on-site items identified by the user while at construction site 102 is illustrated in FIG. 5. As shown in FIG. 5, client station 101 may present a user-interface (UI) view 500 through which the user can control the client station's capture of audiovisual recordings that are descriptive of on-site items identified by the user while at construction site 102.

For instance, FIG. 5 shows that at a first example time $T_1$ when the user has not yet captured any media content at construction site 102, UI view 500 includes (i) a selectable "Start Recording" button 501 that may be selected by the user in order to instruct client station 101 to start capturing a first audiovisual recording for a first on-site item identified by the user, which is shown to be an issue with the caulking of a bath tub located in the master bathroom of construction site 102, and (ii) an unhighlighted timer 502 with a value of 00:00:00, which indicates that client station 101 is not currently engaging in an active media capture session.

At some point after time $T_1$, the user may then select the "Start Recording" button 501, and in response to detecting this user input, client station 101 may function to (i) update UI view 500 to indicate that client station 101 has begun capturing the first audiovisual recording for the first on-site item, and (ii) begin capturing the first audiovisual recording for the first on-site item identified by the user while the user points the client station's camera at the place where the first on-site item was identified (e.g., the place in the bath tub where the caulking issue was discovered) and verbally describes the first on-site item (e.g., by saying that "there is a large caulking gap in the bath tub"). This functionality is illustrated in FIG. 5, which shows that at a second example time $T_2$, UI view 500 now includes (i) a selectable "Stop Recording" button 503 in place of the selectable "Start Recording" button 501, which may be selected by the user in order to instruct client station 101 to stop capturing the first audiovisual recording, and (ii) a highlighted timer 504 with a value of 00:00:04, which indicates that client station 101 is actively capturing the first audiovisual recording and has currently recorded 4 seconds of audiovisual content that is descriptive of the first on-site item.

At some later point after time $T_2$, the user may then select the "Stop Recording" button 503, and in response to detecting this user input, client station 101 may function to (i) stop capturing the first audiovisual recording for the first on-site item and (ii) update UI view 500 to indicate that client station 101 is ready to capture a second audiovisual recording for a second on-site item identified by the user. This functionality is illustrated in FIG. 5, which shows that at a third example time $T_3$, UI view 500 has reverted back to showing the selectable "Start Recording" button 501 and the unhighlighted timer 502 with a value of 00:00:00, but also shows that UI view 500 includes an indication the first audiovisual recording for the first on-site item was successfully recorded (e.g., by presenting an "Item Recorded" text notification and also presenting a "(1)" next to "Review Items" to indicate that 1 on-site item has been captured).

From this point forward, the user may then use UI view 500 to control the client's capture of additional audiovisual recording for additional on-site items identified by the user at construction site 102 in a similar manner to that described above.

The manner in which client station 101 is used to capture the media content that is descriptive of the on-site items identified by the user while at construction site 102 may take various other forms as well.

Returning to FIG. 4, at block 402, client station 101 may optionally supplement the captured media content with other information available to client station 101 that is descriptive of the on-site items identified by the user at construction site 102, which may be referred to herein as "supplemental information." This supplemental information may take various forms.

As one possibility, client station 101 may supplement the captured media content with information about the location of the different on-site items identified by the user at construction site 102 (e.g., the specific room or area in which an on-site item is identified). Such location information may take various forms and be obtained by client station 101 in various manners.

For instance, according to one example implementation, the user may use client station 101 to scan a QR code (or some other type of marker) in proximity to an on-site item before, during, and/or after capturing the media content that is descriptive of the on-site item, and client station 101 may then use the scanned QR code (either alone or in combination with IMU and/or GPS data captured by client station 101) as a basis for obtaining location information that may be used to supplement the captured media content that is descriptive of the identified on-site item.

According to another example implementation, client station 101 may be configured to determine its location within construction site 102 using positioning system technology, in which case client station 101 may supplement the captured media content that is descriptive of the identified on-site item with the client station's determined location at or around the time that the media content is captured. In this respect, the positioning system technology that is used by client station 101 to determine its location within construction site 102 may take any of various forms, examples of which may include GLANS technology (e.g., GPS), beacon technology (e.g., Bluetooth beacons), WiFi-based technology, Radio Frequency Identification (RFID) technology, Near Field Communication (NFC) technology, and/or magnetic positioning technology, among other possibilities.

According to yet another example implementation, client station 101 may be configured to determine its location within construction site 102 using Simultaneous Localization and Mapping (SLAM) technology, which may enable client station 101 to derive its location based on sensor data captured by client station 101 (e.g., image data, IMU data, etc.).

According to still another example implementation, client station 101 may be configured to receive user input indicating a location of an on-site item before, during, and/or after capturing the media content that is descriptive of the on-site item, in which case client station 101 may use this user-based location information to supplement the captured media content that is descriptive of the identified on-site item. In this example implementation, the user input indicating a location of an on-site item may take any of various forms, examples of which may include a textual identification of the location that is typed by the user, a selection of a location within a 2D drawing of construction site 102 that is presented to the user, and/or a verbal identification of the location that is spoken by the user (which could correspond to a particular location in a 2D drawing or the like), among other possibilities.

Client station 101 may supplement the captured media content with location information that is obtained in other manners and/or takes other forms as well. Further, it should be understood that, at least in some circumstances, it is possible that multiple different locations may apply to a given piece of media content captured by client station 101 (e.g., circumstances where a given piece of media content is descriptive of multiple on-site items), in which case the location information that is used to supplement the given piece of media content may provide an indication of multiple different locations of client station 101 at multiple different times.

As another possibility, client station 101 may supplement the captured media content with information about the user of client station 101, which is descriptive of the identified on-site items in the sense that the user is the creator of such on-site items. For instance, client station 101 may be configured to maintain a user profile that includes certain information about the user (e.g., name, job title, company name, email address, permissions, etc.), in which case client station 101 may use this user profile to supplement the captured media content that is descriptive of each on-site item identified by the user, among other possibilities.

As yet another possibility, client station 101 may supplement the captured media content with information about the date and/or time when such media content was captured. For instance, client station 101 may be configured to determine a date and/or time at the beginning and/or end of each respective media capture session and then supplement the resulting media content with the determined date and/or time information, among other possibilities.

As still another possibility, to the extent that client station 101 is able to determine a particular class of on-site items for which the media content is being captured, client station 101 may supplement the captured media content with this information as well. For instance, it is possible that client station 101 may be installed with different software tools that are used for documenting and managing different classes of on-site items, and based on which of these software tools is selected and used to control the client station's capture of media content, client station 101 may be able to determine the particular class of the of on-site items for which the media content is being captured—which may then be used to supplement the captured media content. In this respect, as noted above, software tools for documenting and managing different classes of on-site items could take various forms, examples of which may include a "Punch List" tool for documenting and managing punch items, an "Observations" tool for documenting and managing observation items, an "Incidents" tool for documenting and managing incident items, a "Daily Log" tool for documenting and managing daily-log items, and a "Task" tool for documenting and managing task items. Client station 101 may be able to determine a particular class of on-site items for which the media content is being captured in other manners as well (e.g., based on other types of user input).

It should be understood that client station 101 may be configured to supplement the captured media content with other types of supplemental information as well. Further, it should be understood that, in practice, client station 101 may use any of various techniques for associating the supplemental information with the captured media content, including but not limited to adding the supplemental information to the captured media content as a form of metadata for the captured media content, appending a data structure to the captured media content that contains the supplemental information, and/or creating a separate data structure for the supplemental information that is associated with the captured media content in some way (e.g., via a media content identifier), among other possibilities.

At block 403, the captured media content (along with any supplemental information) may be communicated from client station 101 to back-end platform 103 via communication network 104. This function may take various forms.

As one possibility, the captured media content (along with any supplemental information) may be communicated from client station 101 to back-end platform 103 on a capture-by-capture basis, in which case client station 101 may be configured to prepare and send each respective piece of media content captured by client station 101 (e.g., each audio or audiovisual recording) to back-end platform 103 as soon as the capture of the respective piece of media content has finished (or at least as soon as client station 101 is able to send the respective piece of media content after the capture has finished). For example, with reference to UI view 500 of FIG. 5, client station 101 may be configured to prepare and send the first audiovisual recording for the first on-site item to back-end platform 103 as soon as client station 101 detects that the user has selected the "Stop Recording" button 503.

As another possibility, the captured media content (along with any supplemental information) may be communicated from client station 101 to back-end platform 103 in batches, in which case client station 101 may be configured to compile multiple pieces of media content captured by client station 101 (e.g., multiple audio or audiovisual recordings) into a batch and then subsequently prepare and send that batch of captured media content to back-end platform 103 in response to detecting some triggering event. In this respect, the triggering event for preparing and sending the batch of captured media content to back-end platform 103 may take various forms, examples of which may include detecting that a threshold amount of media content has been compiled into the batch, detecting that a threshold amount of time has passed since sending a last batch of captured media content, and/or detecting that a network connection between client station 101 and back-end platform 103 is of sufficient quality to send the batch, among other possibilities.

The communication of the captured media content (along with any supplemental information) from client station 101 to back-end platform 103 via communication network 104 may take other forms as well.

Further, in practice, the function of communicating the captured media content (along with any supplemental information) from client station 101 to back-end platform 103 via communication network 104 may include various data processing operations, including but not limited to encoding, compression, and/or packetization of the captured media content at client station 101 and/ decoding, decompression, and/or depacketization of the captured media content at back-end platform 103, among other possibilities.

At block 404, back-end platform 103 may extract a respective set of information for each of the on-site items identified by the user at construction site 102 from the captured media content (and perhaps also from certain supplemental information). Depending on the form of the captured media content and/or the type of on-site items that were identified by the user at construction site 102, this functionality may take various forms, and may involve technology such as speech recognition, image recognition, natural language processing (NLP), and/or machine learning techniques such as neural networks (including deep learning and/or transfer learning), regression, k-Nearest Neighbor (kNN), decision-tree, support-vector-machine (SVM), Bayesian, ensemble (e.g., Gradient boosting), clustering, association-rule-learning, and/or dimensionality-reduction, among other possibilities.

One possible implementation of how back-end platform 103 may extract a respective set of information for each of the on-site items identified by the user at construction site 102 from the captured media content (and perhaps also from certain supplemental information) will now be described with reference to FIG. 6, which shows a simplified block diagram 600 that depicts some example functions that may be carried out as part of block 404 of FIG. 4.

Figure 6:
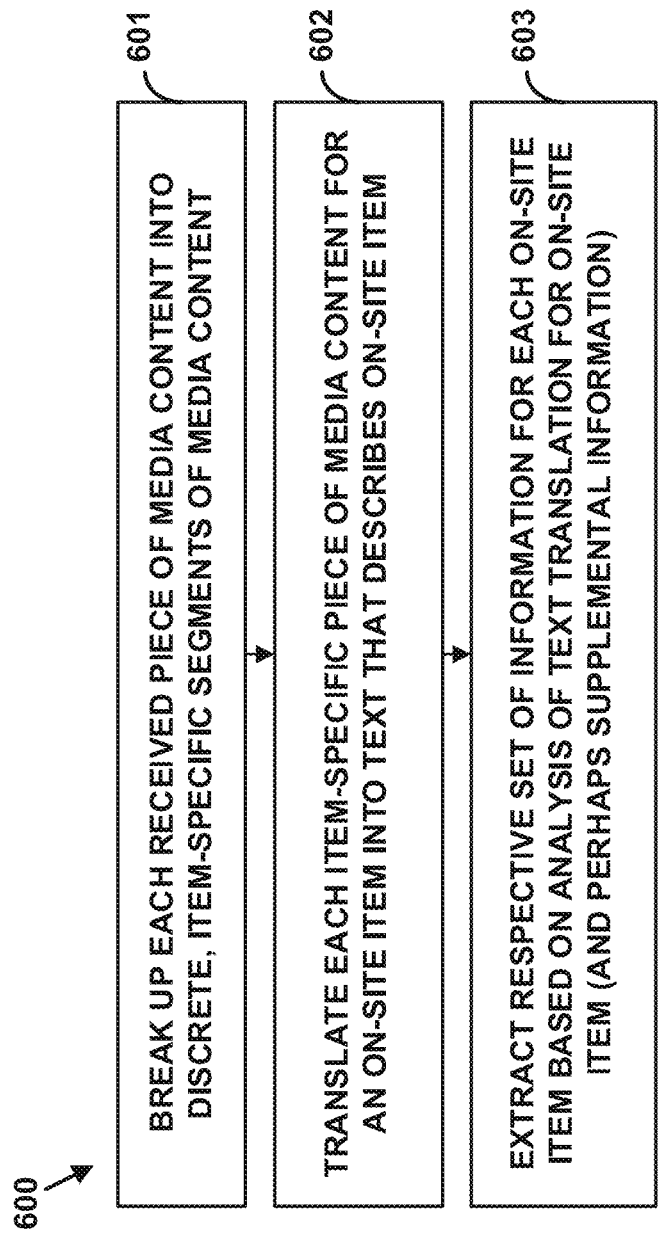
FIG. 6 depicts another example flow diagram illustrating example functions that may be carried out in accordance with one embodiment of the disclosed software technology.

As shown at block 601 of FIG. 6, in an implementation where it is possible that a single piece of media content captured by client station 101 may be descriptive of multiple on-site items identified by the user at construction site, back-end platform 103 may initially function to break up each received piece of media content into discrete, item-specific segments of media content. Back-end platform 103 may perform this segmentation function in various manners.

As one possibility, to the extent that a received piece of media content has been supplemented with location information, back-end platform 103 may use such location information as a basis for breaking up the received piece of media content into discrete, item-specific segments of media content. For example, if the supplemental location information for a received piece of media content indicates that client station 101 had multiple different locations at multiple different times while capturing the received piece of media content, back-end platform 103 may identify the times when client station 101 changed locations while capturing the received piece of media content (which are presumed to correspond to times when the user switched from capturing one on-site item to another) and then use these identified times as the division points for the received piece of media content, thereby resulting in the received piece of media content being broken up into different segments that correspond to the different locations of client station 101. The function of breaking up a received piece of media content based on location information for client station 101 may take other forms as well.

As another possibility, back-end platform 103 may perform an evaluation of a received piece of media content and then use this evaluation as a basis for breaking up the received piece of media content into discrete, item-specific segments of media content. For example, if a received piece of media content comprises an audio or audiovisual recording, back-end platform 103 may perform an evaluation of the audio data included in such a recording in order to identify times when there were "gaps" or the like in the recorded audio (which are presumed to correspond to times when the user switched from capturing one on-site item to another) and then use these identified times as the division points for the received piece of media content, thereby resulting in the received piece of media content being broken up into different segments that are bookended by the identified gaps in the audio data. As another example, if a received piece of media content comprises an audiovisual recording, back-end platform 103 may perform an evaluation of the video data included in such a recording in order to identify times when there was a threshold change in the scene depicted in the video (which are presumed to correspond to times when the user switched from capturing one on-site item to another) and then use these identified times as the division points for the received piece of media content, thereby resulting in the received piece of media content being broken up into different segments that are bookended by the identified changes in the video data. The function of using an evaluation of a received piece of media content as a basis for breaking up the received piece of media content may take other forms as well. Further, it should be understood that, in practice, back-end platform 103 may conduct its evaluation of the media content using any of various types of technology, including but not limited to technology based on machine learning techniques.

Other techniques for breaking up each received piece of media content into discrete, item-specific segments of media content may be employed by back-end platform 103 as well—including not but not limited to the possibility that back-end platform 103 may first translate a received piece of media content into text (as described below) and may then use this text as a basis for breaking the received piece of media content into discrete, item-specific segments of media content. Further, it should be understood that, even in an in an implementation where a single piece of media content captured by client station 101 could potentially be descriptive of multiple on-site items identified by the user at construction site, the foregoing could result in a determination that a given received piece of media content is descriptive of only a single on-site item, in which case back-end platform 103 may forgo breaking up that received piece of media content into multiple, discrete segments.

At block 602, back-end platform 103 may translate each item-specific piece of media content for an on-site item (either as received or as segmented at block 601) into text that describes the on-site item. This function may take various forms, which may depend in part on the form of the captured media content. For instance, if a received piece of media content comprises an audio recording, back-end platform 103 may employ speech recognition technology to transcribe the audio data into text. Alternatively, if a received piece of media content comprises an audiovisual recording, back-end platform 103 may similarly employ speech recognition technology to transcribe the audio data into text, and may also optionally translate certain aspects of the video data into text as well. For example, back-end platform 103 may optionally be configured to apply image recognition technology to the video data (e.g., object classification and/or detection models) and then generate text that describes the results of that image recognition (e.g., textual descriptions of object classes and/or specific objects that are recognized in the video data). The function of translating each item-specific piece of media content for an on-site item into text that describes the on-site item may take other forms as well.

Further, it should be understood that, in practice, the speech and/or image recognition technology employed by back-end platform 103 may take any of various forms, including but not limited to technology based on machine learning techniques (e.g., deep learning, transfer learning, etc.). For example, such speech and/or image recognition technology may comprise machine learning models that have been trained with labeled training data that is not specific to on-site items (e.g., audio data from various sources that has been labeled with text transcriptions and/or video or image data from various sources that has been labeled with object classifications), labeled training data that is specific to on-site items (e.g., audio data describing on-site items that has been labeled with text transcriptions and/or video or image data describing on-site items that has been labeled with object classifications), or some combination thereof. In this respect, at least some of the labeled training data used to train such a machine learning model could have been received and stored at back-end platform 103 in connection with the use of previously-offered tools for documenting and managing on-site items (e.g., Procore's Punch List, Observations, Incidents, Daily Log, and/or Task tools). The speech and/or image recognition technology employed by back-end platform 103 may take other forms as well.

At block 603, back-end platform 103 may extract a respective set of information for each on-site item based on an analysis of the text translation for the on-site item (and perhaps also any applicable supplemental information), which may involve the use of natural language processing (NLP) and/or other machine learning techniques. The information that is extracted for an on-site item and the manner in which such information is extracted may take any of various forms.

One type of information that may be extracted from the text translation for an on-site item may take the form of a free-form description of the on-site item, which may be extracted by back-end platform 103 in various manners. For instance, as one possibility, back-end platform 103 may extract the entire text translation for an on-site item as the free-form description of the on-site item. To illustrate with an example, if back-end platform 103 translates a received, item-specific piece of media content for an on-site item into text that reads: "There is a large caulk gap in the bath tub of the master bathroom," back-end platform 103 may extract this entire text translation as the free-form description of the on-site item.

As another possibility, back-end platform 103 may extract a modified version of the text translation for an on-site item as the free-form description of the on-site item, such as a parsed, shortened, and/or cleaned-up version of the text translation for the on-site item, which may involve the use of NLP technology (e.g., dependency parsing, name entity recognition, etc.). To illustrate with an example, if back-end platform 103 translates a received, item-specific piece of media content for an on-site item into text that reads: "There is a large caulk gap in the bath tub of the master bathroom we are in unit 105 we will assign this to someone from ABC Caulking Company," back-end platform 103 may use NLP technology to recognize and parse out the parts of the text translation that provide location and assignee information for the on-site item, which results in an extracted free-form description of "There is a large caulk gap in the bath tub of the master bathroom."

As yet another possibility, back-end platform 103 may provide users involved in a construction project with the option to create predefined "on-site item templates" for certain on-site items (e.g., on-site items that are commonly encountered) that each include a respective set of prepopulated information for an on-site item, and if any such predefined on-site item templates have been created, back-end platform 103 could use these predefined on-site item templates as a basis for extracting a description for an on-site item. For example, back-end platform 103 may analyze the text translation for an on-site item using a machine learning model (or the like) that is trained to evaluate the extent to which the text translation appears to "match" each predefined on-site item templates that has been created, and if back-end platform 103 determines based on this analysis that there is a close enough match between the text translation and one of the predefined on-site item templates, back-end platform 103 may then adopt a prepopulated description from that predefined on-site item template (to the extent included) as the extracted description for the on-site item. (It should also be understood that back-end platform 103 could potentially employ a similar technique to evaluate whether the text translation for an on-site item matches certain other data records that are stored at back-end platform 103, regardless of whether such data records are technically considered to be templates.)

Back-end platform 103 may extract a free-form description of an on-site item in other manners as well.

Another type of information that may be extracted from the text translation for an on-site item may take the form of a title for the on-site item, which may be extracted by back-end platform 103 in various manners. For instance, as one possibility, back-end platform 103 may analyze the text translation for the on-site item using text-summarization technology, which is a form of NLP technology that functions to generate a summarized version of input text, and back-end platform 103 may then extract the summarized version of the text translation as the title of the on-site item. To illustrate with an example, if back-end platform 103 translates a received, item-specific piece of media content for an on-site item into text that reads: "There is a large caulk gap in the bath tub of the master bathroom," back-end platform 103 could then summarize this text translation into a title for the on-site item that reads "Caulk Gap."

The text-summarization technology that is used by back-end platform 103 to extract a title of an on-site item from the on-site item's text translation may take any of various forms, including but not limited to technology based on machine learning techniques (e.g., deep learning, transfer learning based on Bidirectional Encoder Representations from Transformers (BERT) technology, etc.). For example, such text-summarization technology may comprise a machine learning model that has been trained with labeled training data that is not specific to on-site items (e.g., textual data of various forms that is labeled with summarized versions of such textual data), labeled training data that is specific to on-site items (e.g., textual descriptions of on-site items that are labeled with titles assigned to such on-site items), or some combination thereof. In this respect, at least some of the labeled training data used to train such a machine learning model could have been received and stored at back-end platform 103 in connection with the use of previously-offered tools for documenting and managing on-site items (e.g., Procore's Punch List, Observations, Incidents, Daily Log, and/or Task tools). The text-summarization technology employed by back-end platform 103 may take other forms as well.

As another possibility, in line with the discussion above, back-end platform 103 could use predefined on-site item templates as a basis for extracting a title for an on-site item. For example, back-end platform 103 may analyze the text translation for an on-site item using a machine learning model (or the like) that is trained to evaluate the extent to which the text translation appears to "match" each predefined on-site item template that has been created, and if back-end platform 103 determines based on this analysis that there is a close enough match between the text translation and one of the predefined on-site item templates, back-end platform 103 may then adopt a prepopulated title from that predefined on-site item template (to the extent included) as the extracted title for the on-site item. (It should also be understood that back-end platform 103 could potentially employ a similar technique to evaluate whether the text translation for an on-site item matches certain other data records that are stored at back-end platform 103, regardless of whether such data records are technically considered to be templates.)

Back-end platform 103 may extract a title of an on-site item in other manners as well.

Yet another type of information that may be extracted from the text translation for an on-site item may take the form of an individual that is responsible for the on-site item (e.g., an assignee and/or a manager of the on-site item), which may be extracted by back-end platform 103 in various manners. For instance, as one possibility, back-end platform 103 may analyze the text translation for an on-site item using name-recognition technology, which is a form of NLP technology that functions to recognize names of people and/or organizations within input text. To the extent that this analysis results in recognition of the name of a person in the text translation for the on-site item (e.g., "John Smith"), back-end platform 103 either may extract the recognized name as a responsible individual for the on-site item or may perform a further analysis to determine whether the recognized name should be designated as a responsible individual for the on-site item, which may involve an analysis of other words that surround the recognized name within the text translation and/or an analysis of other relevant information that may be available to back-end platform 103 (e.g., customer templates that indicate the list of possible assignees for different types of on-site items), among other possibilities. On the other hand, to the extent that this analysis results in recognition of a name of an organization in the text translation for the on-site item (e.g., "ABC Caulking Company"), back-end platform 103 may then perform a further analysis of other relevant information that may be available to back-end platform 103 to determine which individual from the organization (if any) should be designated as a responsible individual for the on-site item. (It should also be understood that back-end platform 103 could also simply designate the name of the organization as the responsible individual.)

The name-recognition technology that is used by back-end platform 103 to extract a responsible individual for an on-site item from the on-site item's text translation may take any of various forms, including but not limited to technology based on machine learning techniques. For example, such name-recognition technology may comprise a machine learning model that has been trained with labeled training data that is not specific to on-site items (e.g., textual data of various forms that is labeled with data indicating the names of particular people and/or organizations that are included in such textual data), labeled training data that is specific to on-site items (e.g., textual descriptions of on-site items that are labeled with data indicating the names of the responsible individuals mentioned in such textual descriptions), or some combination thereof. In this respect, at least some of the labeled training data used to train such a machine learning model could have been received and stored at back-end platform 103 in connection with the use of previously-offered tools for documenting and managing on-site items (e.g., Procore's Punch List, Observations, Incidents, Daily Log, and/or Task tools). The name-recognition technology employed by back-end platform 103 may take other forms as well.

As another possibility, in line with the discussion above, back-end platform 103 could use predefined on-site item templates as a basis for extracting a responsible individual for an on-site item. For example, back-end platform 103 may analyze the text translation for an on-site item using a machine learning model (or the like) that is trained to evaluate the extent to which the text translation appears to "match" each predefined on-site item template that has been created, and if back-end platform 103 determines based on this analysis that there is a close enough match between the text translation and one of the predefined on-site item templates, back-end platform 103 may then adopt a pre-populated responsible individual from that predefined on-site item template (to the extent included) as the extracted responsible individual for the on-site item. (It should also be understood that back-end platform 103 could potentially employ a similar technique to evaluate whether the text translation for an on-site item matches certain other data records that are stored at back-end platform 103, regardless of whether such data records are technically considered to be templates.)

Back-end platform 103 may extract a responsible individual for an on-site item in other manners as well.

Still another type of information that may be extracted from the text translation for an on-site item may take the form of a categorization of the on-site item, which could vary depending on the nature of the on-site item at issue. As some representative examples, an on-site item may be categorized in terms of a type of the on-site item (e.g., unfinished-work item, quality item, safety item, status item, etc.), a trade that is implicated by the on-site item (e.g., caulking, electrical, plumbing, carpentry, HVAC, finishes, etc.), a cost category for the on-site item, and/or a priority level of the on-site item (e.g., high, medium, or low), among other possibilities. Such a categorization of an on-site item may be extracted by back-end platform 103 in various manners.

For instance, as one possibility, back-end platform 103 may analyze the text translation for the on-site item using text-classification technology, which is a form of NLP technology that functions to predict between different classification options based on input text. In this respect, back-end platform 103 may be configured to input the text translation for the on-site item into a respective text classifier for each form of categorization to be extracted for an on-site item (e.g., one text classifier for item type, another text classifier for trade, etc.). To illustrate with an example, if an on-site item is to be categorized in terms of a trade that is implicated by the on-site item, back-end platform 103 may input the text translation for the on-site item (and perhaps also certain supplemental information) into a text classifier that functions to predict which one or more trades are implicated by the on-site item based on an analysis of the text translation, and back-end platform 103 may then extract the output of this text classifier as the trade for the on-site item. Back-end platform 103 may extract other forms of categorization of the on-site item (e.g., item type, cost category, priority level, etc.) in a similar manner.

The text-classification technology that is used by back-end platform 103 to extract a categorization of an on-site item from the on-site item's text translation may take any of various forms, including but not limited to technology based on machine learning techniques (e.g., deep learning, transfer learning, etc.). For example, a text classifier for predicting a particular categorization of on-site items (e.g., trade) may comprise a machine learning model that has been trained with labeled training data that is not specific to on-site items, labeled training data that is specific to on-site items (e.g., textual descriptions of on-site items labeled with categorization information such as the particular trades implicated by such on-site items), or some combination thereof. In this respect, at least some of the labeled training data used to train such a machine learning model could have been received and stored at back-end platform 103 in connection with the use of previously-offered tools for documenting and managing on-site items (e.g., Procore's Punch List, Observations, Incidents, Daily Log, and/or Task tools). As another example, a text classifier for predicting a particular categorization of on-site items may comprise a set of linguistic rules that are based on keyword matching or the like. The text-classification technology employed by back-end platform 103 may take other forms as well.

As another possibility, in line with the discussion above, back-end platform 103 could use predefined on-site item templates as a basis for extracting a categorization of an on-site item. For example, back-end platform 103 may analyze the text translation for an on-site item using a machine learning model (or the like) that is trained to evaluate the extent to which the text translation appears to "match" each predefined on-site item template that has been created, and if back-end platform 103 determines based on this analysis that there is a close enough match between the text translation and one of the predefined on-site item templates, back-end platform 103 may then adopt a pre-populated categorization from that predefined on-site item template (to the extent included) as the extracted categorization of the on-site item. (It should also be understood that back-end platform 103 could potentially employ a similar technique to evaluate whether the text translation for an on-site item matches certain other data records that are stored at back-end platform 103, regardless of whether such data records are technically considered to be templates.)

Back-end platform 103 may extract a categorization of an on-site item in other manners as well Back-end platform 103 may be configured to extract various other types of information from an on-site item's text translation as well.

Further, as noted above, back-end platform 103 may also be configured to extract certain types of information for an on-site item from supplemental information that is received along with the captured media content for the on-site item. For example, as noted above, the captured media content that is descriptive of an on-site item may have been supplemented with location information, in which case back-end platform 103 may extract a location of the on-site item from this supplemental location information. (Additionally or alternatively, it should be understood that back-end platform 103 could extract a location of an on-site item from the text translation of the on-site item using technology similar to that described above). As another example, as noted above, the captured media content that is descriptive of an on-site item may have been supplemented with information about the user of client station 101, in which case back-end platform 103 may extract a creator of the on-site item from this supplemental user information. As yet another example, as noted above, the captured media content that is descriptive of an on-site item may have been supplemented with information indicating a date and/or time when the media content was captured, in which case back-end platform 103 may use this supplemental date and/or time information to extract date and/or time information for the on-site item (e.g., create date/time, due date, etc.). Back-end platform 103 may be configured to extract other types of information for an on-site item from supplemental information as well.

Further yet, in some implementations, back-end platform 103 may be configured to extract certain types of information for an on-site item from the captured media content itself (as opposed to from the text translation of the captured media content). For instance, if the captured media content that is descriptive of an on-site item comprises an audiovisual recording, back-end platform 103 may be configured to extract one or more images from the audiovisual recording that provide a visual representation of the on-site item. In this respect, back-end platform 103 may be configured to either (i) capture an image at a predefined point within an audiovisual recording for an on-site item (e.g., the halfway marker of the audiovisual recording) or (ii) dynamically determine the point within an audiovisual recording for an on-site item at which to capture an image based on an analysis of the video data (e.g., an analysis of which point provides a "best view" of the on-site item), which may involve the use of technology based on machine learning techniques or the like. Back-end platform 103 may be configured to extract other types of information for an on-site item from the captured media content as well.

It should be understood that, in practice, the training of the machine learning models discussed above could be carried out by back-end platform 103 and/or by one or more computing platforms. For instance, as one possibility, back-end platform 103 may train a machine learning model from scratch based on training data stored at back-end platform 103 (e.g., historical information about on-site items that has previously been received and/or derived by back-end platform 103). As another possibility, back-end platform 103 may be provided with a machine learning model that has been pre-trained by one or more other computing platforms and back-end platform 103 may then perform further training of the pre-trained machine learning model based on training data stored at back-end platform 103 before deploying the machine learning model. As yet another possibility, back-end platform 103 may be provided with a machine learning model that has been pre-trained by one or more other computing platforms and back-end platform 103 may then deploy the pre-trained machine learning model without any further training. Other implementations are possible as well.

The information that is extracted for an on-site item and the manner in which such information is extracted may take various other forms as well.

In line with the discussion above, it should be understood that FIG. 6 merely illustrates one possible implementation of how back-end platform 103 may extract a respective set of information for each of the on-site items identified by the user at construction site 102 from the captured media content (and perhaps also from certain supplemental information), and that back-end platform 103 may extract a respective set of information for each of the on-site items identified by the user at construction site 102 from the captured media content (and perhaps also from certain supplemental information) in various other manners as well.

Returning to FIG. 4, at block 405, back-end platform 103 may generate a respective data record for each on-site item identified by the user at construction site 102 based on the respective set of information that is extracted for the on-site item. This functionality may take various forms.

According to one possible implementation, back-end platform 103 may begin by selecting a schema to use for an on-site's data record, which specifies the set of data fields that are to be included in a data record and perhaps also the manner in which that set of data fields are to be organized, structured, and/or formatted within the data record. Back-end platform 103 may select such a schema in various manners.

As one possibility, back-end platform 103 may select which schema to use for a data record based on a class of the on-site item for which the data record is being generated (e.g., based on whether the on-site item is a punch item, an observation item, an incident item, a daily log item, a task item, etc.). For instance, back-end platform 103 may be configured to maintain and use different data-record schemas for different classes of on-site items, and back-end platform 103 may select between these different data-record schemas based on the particular class of the on-site item for which the data record is being generated—which may either be included as supplemental information that is received by back-end platform 103 along with the captured media content or be determined by back-end platform 103 in some other manner.

As another possibility, back-end platform 103 may select which schema to use for a data record based on a type of the on-site item for which the data record is being generated (e.g., based on whether the on-site item is an unfinished-work item, a quality item, a safety item, a status item, etc.). For instance, back-end platform 103 may be configured to maintain and use different data-record schemas for different types of on-site items, and back-end platform 103 may select between these different data-record schemas based on the particular type of the on-site item for which the data record is being generated—which may either be included as supplemental information that is received by back-end platform 103 along with the captured media content or be determined by back-end platform 103 in some other manner (e.g., based on an analysis of the media content).

As yet another possibility, back-end platform 103 may select which schema to use for a data record based on a combination of a class and a type of the on-site item for which the data record is being generated. For instance, for one given class of on-site items (e.g., punch items), back-end platform 103 may be configured to maintain and use only a single data-record schema that applies to each type of on-site item included in that class, whereas for another given class of on-site items (e.g., observations), back-end platform 103 may be configured to maintain and use multiple different data-record schemas for different types of on-site items included in the class—in which case the back-end platform's selection of which data-record schema to use for an on-site item may be dependent on both the class of the on-site and also the type of the on-site item.

Back-end platform 103 may select which schema to use for a data record in other manners as well. Further, it should be understood that, in some implementations, back-end platform 103 could be configured to maintain and use one global schema for all data records that are generated for the on-site items identified by the user at construction site 102. Further yet, it should be understood that the one or more schemas maintained by back-end platform 103 may be predefined by the platform operator and/or may be defined based on user input (e.g., predefined user templates or the like), among other possibilities.

After back-end platform 103 has selected the data-record schema to use for an on-site item, back-end platform 103 may then function to map the respective set of information that was extracted for the on-site item to the data fields of the selected data-record schema. This function may take various forms. As one possibility, back-end platform 103 may be configured such that, at the time of extracting the set of information for an on-site item, back-end platform 103 tags each piece of extracted information with an indicator of one or more structured data fields to which the piece of extracted information corresponds, in which case back-end platform 103 may use these tags to map the respective set of information that was extracted for the on-site item to the data fields of the selected data-record schema. For example, an extracted free-form description for an on-site item may be tagged as corresponding to a "Description" field, an extracted title for an on-site item may be tagged as corresponding to a "Title" field, an extracted responsible individual for an on-site item may be tagged as corresponding to an "Assignee" and/or "Manager" field, an extracted trade for an on-site item may be tagged as corresponding to a "Trade" field, an extracted location for an on-site item may be tagged as corresponding to a "Location" field, an extracted creator for an on-site item may be tagged as corresponding to a "Creator" field (and perhaps other fields that are initially defaulted to the on-site item's creator such as a "Ball-in-Court" field), an extracted image for an on-site item may be tagged as corresponding to an "Image" (or "Screenshot") field, and so on. Back-end platform 103 map the respective set of information that was extracted for the on-site item to the data fields of the selected data-record schema in other manners as well.

After mapping the set of information that was extracted for an on-site item to the data fields of the selected data-record schema, the resulting set of populated data fields may comprise the generated data record for on-site item, which back-end platform 103 may store in a platform-side data store.

The function of generating a respective data record for each on-site item based on the extracted information for the on-site item may take other forms as well.

In some implementations, the data records that are generated by back-end platform 103 based on the extracted information may be assigned an approved status at this point in the workflow (which could also be referred to as a final status), in which case back-end platform 103 may handle the data records in accordance with this approved status. For example, back-end platform 103 may store the data records in a storage location that is designated for approved data records of this type, include the data records in any listing of existing data records of this type (e.g., data records for punch items included in a given punch list), and/or make such data records available to the full universe of users that would generally have access to data records of this type (e.g., project managers, assignees and/or managers of the on-site items, etc.), among other possibilities.

Alternatively, in other implementations, the data records that are generated by back-end platform 103 based on the extracted information may be assigned an unapproved status at this point in the workflow (which could also be referred to as a draft status), in which case back-end platform 103 may handle the data records in accordance with this unapproved status unless and until it receives an indication of user approval for the data records. For example, back-end platform 103 may store the data records in a separate storage location that is designated for unapproved data records of this type, refrain from including the data records in any listing of existing data records of this type, and/or limit the universe of users that are able to access the data records, among other possibilities.

In implementations where the data records generated by back-end platform 103 are initially assigned an unapproved status pending user approval, the disclosed software technology may additionally facilitate this user approval. For instance, once the data records are generated by back-end platform 103, the disclosed software technology may provide the user of client station 101 (or perhaps some other qualified user) with the ability to review, edit, and/or approve the generated data records, either on client station 101 or on another client station that is capable of accessing the generated data records from back-end platform 103 (e.g., a laptop or desktop computer that is located somewhere other than construction site 102). In this respect, it will be appreciated that the disclosed software technology provides a lot of flexibility in terms of when and where the user of client station 101 is able to review, edit, and/or approve the data records that are generated by back-end platform 103 based on the captured media content—the user could choose to review, edit, and/or approve the generated data records shortly after capturing the media content while still at construction site 102, or the user could choose to review, edit, and/or approve the generated data records at a later time after the user has left construction site 102 (and perhaps even on a different client station). Given that a construction site may present a stressful, high-pressure, and/or time-limited environment in which to document on-site items, this option to review, edit, and/or approve the generated data records at a later time after the user has left construction site 102 is another advantage of the disclosed software technology.

To illustrate this additional aspect of the disclosed software technology, FIG. 4 shows some example functions that may be carried out by back-end platform 103 and client station 101 in order to present the data records generated by back-end platform 103 to the user of client station 101 in a manner that enables the user review, edit, and/or approve the generated data records. However, while some of these functions are described below as being carried out by client station 101, it should be understood that a client station other than the one used to capture the media content could be used to review, edit, and/or approve the data records generated by back-end platform 103, and that in some circumstances, a user other than the one that captured the media content could be tasked with reviewing, editing, and/or approving the data records generated by back-end platform 103.

Referring now to FIG. 4, at block 406, the generated data records may be communicated from back-end platform 103 to client station 101 via communication network 104 in order to enable the generated data records to be presented to the user of client station 101—although as noted above, it should be understood that the generated data records could likewise be communicated from back-end platform 103 to some other client station via communication network 104 in order to enable the generated data records to be presented to the user of client station 101, in which case such other client station may carry out following functions for facilitating the review, editing, and/or approval of the generated data records instead of client station 101. This function of communicating the generated data records from back-end platform 103 to client station 101 (or some other client station) via communication network 104 may take various forms.

As one possibility, the generated data records may be communicated from back-end platform 103 to client station 101 on a record-by-record basis as such data records are generated. For instance, back-end platform 103 may be configured to prepare and send each data record generated by back-end platform 103 to client station 101 via communication network 104 as soon as back-end platform 103 has finished generating the respective data record (or at least as soon as back-end platform 103 is able to send the respective data record after it has been generated).

As another possibility, the generated data records may be communicated from back-end platform 103 to client station 101 in batches as such data records are generated. For instance, back-end platform 103 may be configured to compile multiple data records generated by back-end platform 103 into a batch and then subsequently prepare and send that batch of data records to client station 101 via communication network 104 in response to detecting some triggering event. In this respect, the triggering event for preparing and sending the batch of data records to client station 101 may take various forms, examples of which may include detecting that a threshold amount of data records have been compiled into the batch, detecting that a threshold amount of time has passed since sending a last batch of data records, detecting that a threshold amount of time has passed since receiving the media content for a first on-site item included in the batch, and/or detecting that client station 101 is available to receive the next batch of data records, among other possibilities.

As yet another possibility, the generated data records may be communicated from back-end platform 103 to client station 101 in response to requests from client station 101. For instance, back-end platform 103 may be configured to receive requests for the generated data records from client station 101 at various times (e.g., when a user accesses certain UI views of the front-end software component running on client station 101), and in response to receiving each such request, back-end platform 103 may prepare and send generated data records to client station 101. In this respect, the set of generated data records that are sent to client station 101 in response to such a request may take various forms, examples of which may include (i) any data records generated by back-end platform 103 based on media content captured by client station 101 that are still in unapproved form, (ii) any unapproved data records that have been newly generated by back-end platform 103 based on media content captured by client station 101 since the last communication of unapproved data records to client station 101, or (iii) all data records that have been generated by back-end platform 103 based on media content captured by client station 101 regardless of whether such data records are in unapproved or approved form, among other possibilities. It should also be understood that, in some implementations, back-end platform 103 could communicate data records to client station 101 that were generated by back-end platform 103 based on media content captured by a client station other than client station 101 (and perhaps by a user other than the user of client station 101).

The function of communicating the generated data records from back-end platform 103 to client station 101 via communication network 104 may take other forms as well.

At block 407, client station 101 may present the generated data records received from back-end platform 103 to the user of client station 101 in a manner that allows the user to review, edit, and/or approve the generated data records. This functionality may take various forms.

As one possibility, client station 101 may initially present the user with an option for viewing a list of unapproved data records that have been generated by back-end platform 103 for the on-site items identified by the user while at construction site 102, and when this option is selected, client station 101 may present a first UI view that shows the list of unapproved data records. From this list, the user can input a selection of a given one of the unapproved data records for an on-site item identified by the user at construction site 102 (e.g., via a touch screen or mouse), which may then trigger client station 101 to present a second UI view showing the details of the selected data record—including the information that has been extracted and automatically populated into the data fields of the selected data record by back-end platform 103. In addition to showing the details of the selected data record, this second UI view may also provide the user with options for editing the selected data record (e.g., by presenting the data fields as editable text boxes) and/or approving the selected data record (e.g., by presenting a button that enables the user to indicate approval of the data record).

Figure 7:
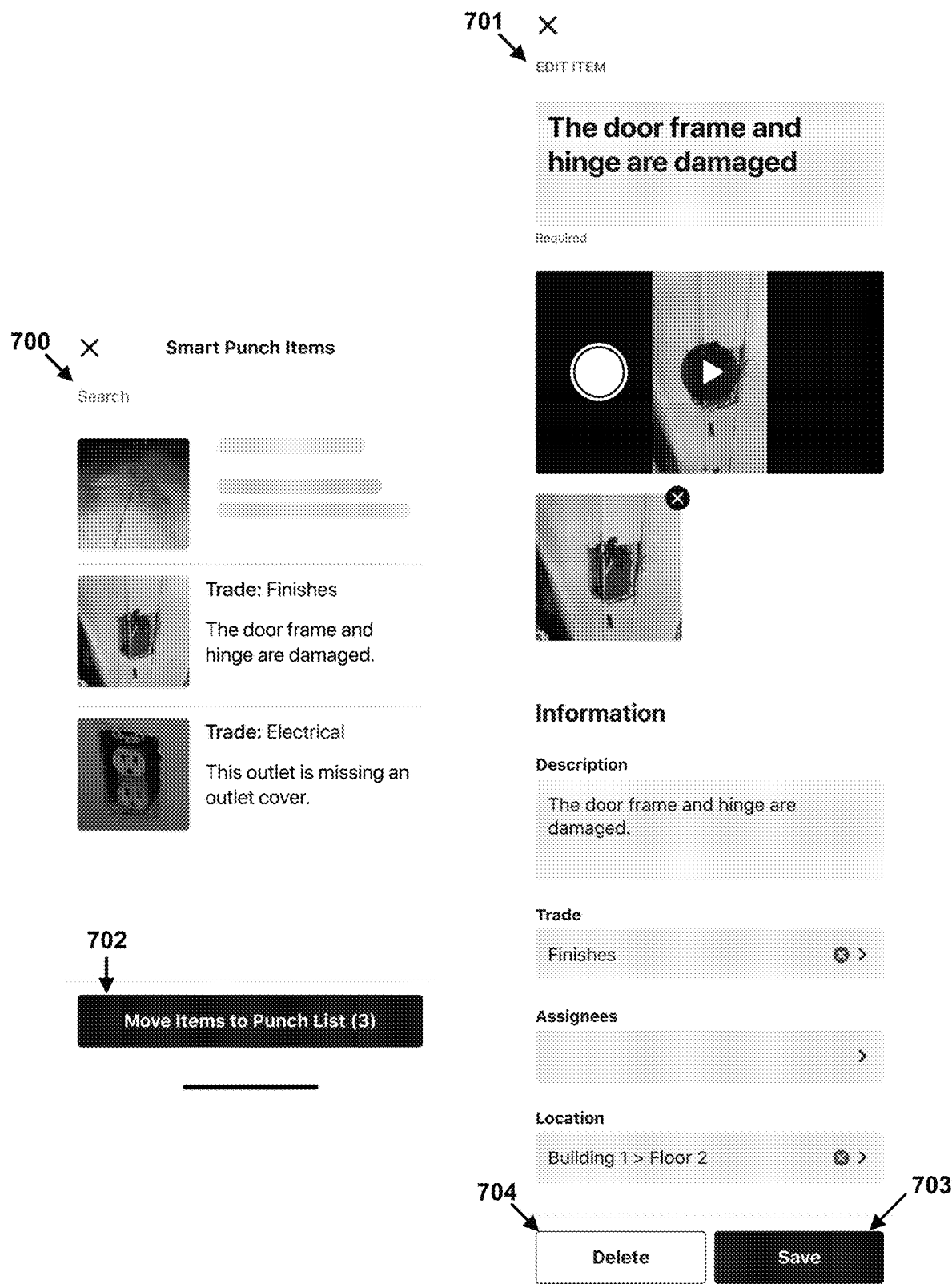
FIG. 7 depicts example user-interface views for reviewing, editing, and approving generated data records in accordance with one embodiment of the disclosed software technology.

Some possible examples of UI views that may be presented to a user for purposes of reviewing, editing, and approving generated data records are illustrated in FIG. 7. In particular, as shown, FIG. 7 illustrates (i) an example of a first UI view 700 that shows a list of unapproved data records that have been generated by back-end platform 103 for punch items that were identified by the user at construction site 102, as well as (ii) an example of a second UI view 701 that shows the details of the unapproved data record for the second punch item shown in the list of UI view 700, which may be presented to the user when that second punch item is selected by the user in UI view 700.

In UI view 700, the presented list of unapproved data records generated by back-end platform 103 includes three punch items—a first punch item for which back-end platform 103 was unable to extract any information to populate into the data record, a second punch item for which back-end platform 103 extracted a description of "The door frame and hinge are damaged" and a trade of "Finishes," and a third punch item for which back-end platform 103 extracted a description of "This outlet is missing an outlet cover" and a trade of "Electrical." Additionally, UI view 700 also provides the user with an option to bulk approve all unapproved data records in the presented list at once, which takes the form of a "Move Items to Punch List" button 702 in FIG. 7.

In turn, in UI view 701, the presented details of the unapproved data record for the second punch item include a "Title" field that has been automatically populated with an extracted title of "The door frame and hinge are damaged," a "Description" field that has been automatically populated with an extracted description of "The door frame and hinge are damaged," a "Trade" field that has been automatically populated with an extracted trade of "Finishes," a "Location" field that has been automatically populated with an extracted location of "Building 1>Floor 2," and an "Image" field that has been automatically populated with an extracted screenshot of the punch item, along with the audiovisual recording of the second punch item that was originally captured by client station 101. Notably, the "Assignees" field of the second "draft" data record is presented to be empty, which indicates that back-end platform 103 was unable to extract any assignee information from the captured media content for the second punch item. Further, as shown, the information in the "Title," "Description," "Trade," and "Location" fields is presented in the form of editable text boxes, which enables the user of client station 101 to edit the information that is extracted and automatically populated by back-end platform 103 for the second punch item. Further yet, as shown, UI view 701 also includes a selectable "Save" button 703, which the user can select to approve the "draft" data record for the second punch item after the user has finished reviewing and potentially editing that data record, as well as a selectable "Delete" button 704, which the user can select to delete the unapproved data record for the second punch item instead of approving it.

In practice, UI views such as these shown in FIG. 7 may be used when implementing the disclosed software technology on client stations that take the form of mobile devices that have less screen real estate, but it should be understood that similar UI views may be used when implementing the disclosed software technology on other types of client stations as well.

Figure 8:
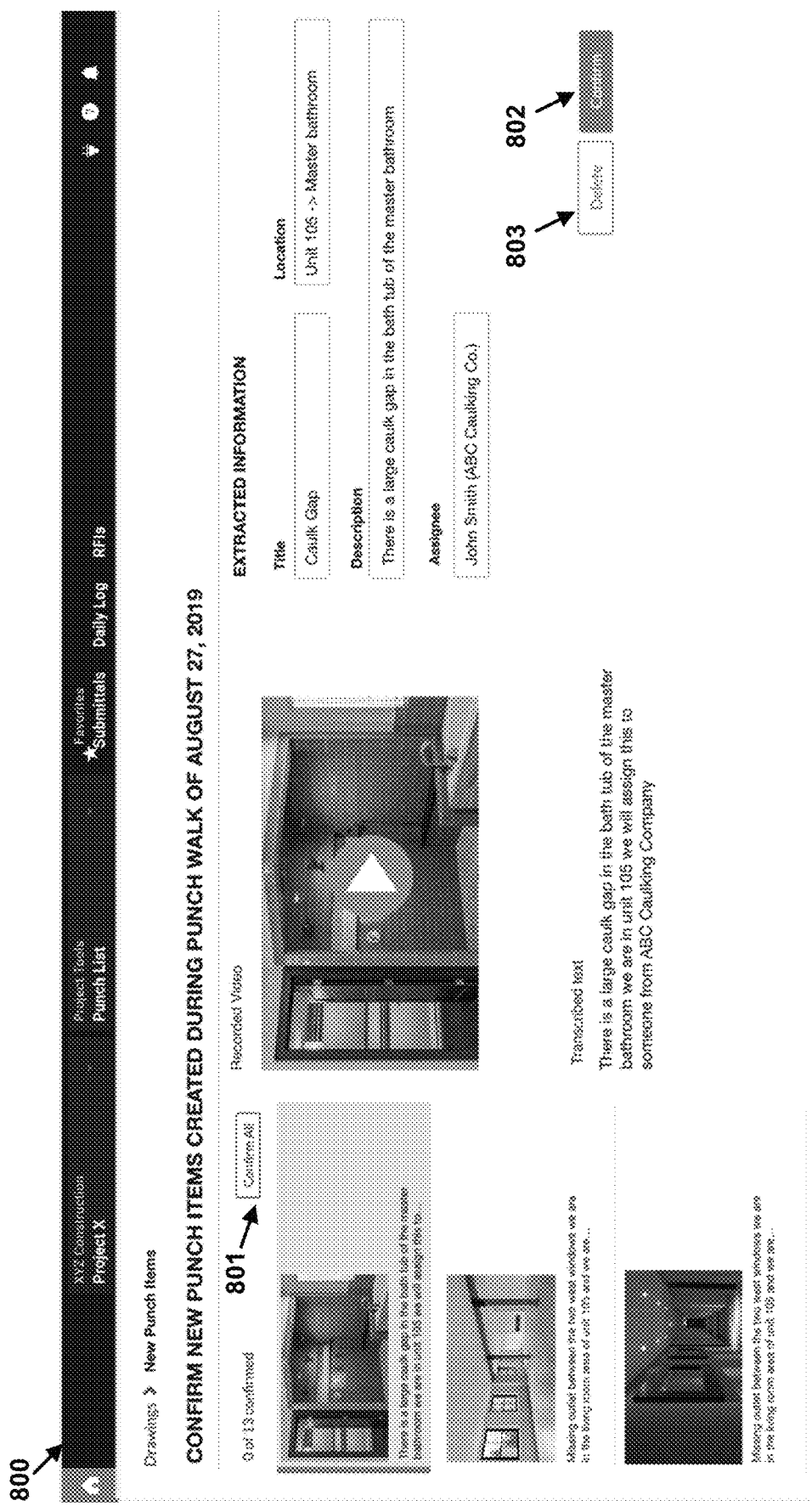
FIG. 8 depicts another example user-interface view for reviewing, editing, and approving generated data records in accordance with one embodiment of the disclosed software technology.

Another possible example of a UI view that may be presented to a user for purposes of reviewing, editing, and approving generated data records is illustrated in FIG. 8. In particular, as shown, FIG. 8 illustrates an example UI view 800 that shows both (i) a list of unapproved data records that have been generated by back-end platform 103 for punch items that were identified by the user at construction site 102 and (ii) the details of the unapproved data record for whichever punch item is currently selected within the presented list of unapproved data records—which is shown to be the first punch item in FIG. 8.

In UI view 800, the presented list of unapproved data records generated by back-end platform 103 includes unapproved data records for a total of 13 punch items identified by the user, of which three are shown). Further, similar to UI view 700, UI view 800 provides the user with an option to bulk approve all unapproved data records in the presented list at once, which takes the form of a "Confirm All" button 801 in FIG. 8.

In turn, in UI view 800, the presented details of the unapproved data record for the first punch item include a "Title" field that has been automatically populated with an extracted title of "Caulk Gap," a "Description" field that has been automatically populated with an extracted description of "There is a large caulk gap in the bath tub of the master bathroom" (which is a parsed version of the text translation for the first punch item), a "Location" field that has been automatically populated with an extracted location of "Unit 105→ Master bathroom," and an "Assignee" field that has been automatically populated with an extracted assignee of "John Smith" from the "ABC Caulking Co.," along with the audiovisual recording of the first punch item that was originally captured by client station 101 and the back-end platform's text translation for the first punch item. Further, as shown, the information in the "Title," "Description," "Location," and "Assignee" fields is presented in the form of editable text boxes, which enables the user of client station 101 to edit the information that is extracted and automatically populated by back-end platform 103 for the first punch item. Further yet, as shown, UI view 800 also includes a selectable "Confirm" button 802, which the user can select to approve the unapproved data record for the first punch item after the user has finished reviewing and potentially editing that data record, as well as a selectable "Delete" button 803, which the user can select to delete the unapproved data record for the first punch item instead of approving it.

In practice, UI views such as these shown in FIG. 8 may be used when implementing the disclosed software technology on client stations that take the form of laptops, desktop computers, or the like that have more screen real estate, but it should be understood that a similar UI view may be used when implementing the disclosed software technology on other types of client stations as well.

Turning now to block 408 of FIG. 4, while client station 101 is presenting the generated data records received from back-end platform 103 to the user of client station 101, client station 101 may receive input from the user (e.g., via the client station's I/O interface) related to a data record for a given on-site item that was generated by back-end platform 103. This input may take any of various forms, examples of which may include a requested edit to certain information that was extracted and automatically populated by back-end platform 103 for the given on-site item, a requested addition of new information that was not extracted by back-end platform 103 for the given on-site item, an indication of the user's approval of the generated data record for the given on-site item, and/or a request to delete the generated data record for the given on-site item, among other possibilities.

In turn, at block 409, the user's input related to the generated data record for the given on-site item may be communicated from client station 101 to back-end platform 103 via communication network 104. For instance, as one possibility, client station 101 may be configured to prepare and send the user's input related to the generated data record for the given on-site item to back-end platform 103 in response to detecting any instance of user input for the generated data record (e.g., each time a user interacts with an editable data field or a selectable button that is presented for with the generated data record). As another possibility, client station 101 may be configured to prepare and send the user's input related to the generated data record for the given on-site item to back-end platform 103 in response to detecting some forms of user input but not others. For example, client station 101 may be configured such that it sends the user's input related to the generated data record in response to detecting that the user has selected a button indicating the user's approval of the generated data record (e.g., a "Save" button, "Confirm" button, or a bulk approve button) or a button indicating the user's desire to delete the generated data record (e.g., a "Delete" button), and client station 101 may otherwise function to keep track of user input related to the generated data record (e.g., requested edits or additions to the information for the given on-site item) that is to be sent once one of the foregoing user actions is detected. The function of communicating the user's input related to the generated data record for the given on-site item from client station 101 to back-end platform 103 via communication network 104 may take other forms as well.

At block 410, after receiving the user's input related to the generated data record for the given on-site item, back-end platform 103 may update the generated data record in accordance with the user's input. This function may take various forms, which may depend on the form of the user input. For example, if the user's input related to the generated data record for the given on-site item includes a requested edit to certain information that was extracted and automatically populated by back-end platform 103 for the given on-site item, back-end platform 103 may update the generated data record to include the edited information. As another example, if the user's input related to the generated data record for the given on-site item includes a requested addition of new information that was not extracted by back-end platform 103 for the given on-site item, back-end platform 103 may update the generated data record to include the new information. As yet another example, if the user's input related to the generated data record for the given on-site item includes an indication of the user's approval of the generated data record for the given on-site item, back-end platform 103 may update the status of the generated data record for the given on-site item from unapproved to approved. As still another example, if the user's input related to the generated data record for the given on-site item includes a request to delete the unapproved data record for the given on-site item, back-end platform 103 may delete (or at least archive) the generated data record. The function of updating the generated data record for the given on-site item in accordance with the user's input may take other forms as well.

At block 411, to the extent that the user's input related to the generated data record for the given on-site item leads back-end platform 103 to update the status of the generated data record for the given on-site item from unapproved to approved, back-end platform 103 may then handle the generated data record in accordance with this approved status. For example, after updating the status of the generated data record for the given on-site item from unapproved to approved, back-end platform 103 may store the generated data record in a storage location that is designated for approved data records of this type. As another example, after updating the status of the generated data record for the given on-site item from unapproved to approved, back-end platform 103 may begin including the generated data record in any listing of existing data records of this type (e.g., data records for punch items included in a given punch list). As yet another example, after updating the status of the generated data record for the given on-site item from unapproved to approved, back-end platform 103 may make the generated data record available to the full universe of users that would generally have access to data records of this type, such as a project manager, an assignee and/or manager of the on-site item, etc. As still another example, after updating the status of the generated data record for the given on-site item from unapproved to approved, back-end platform 103 may issue a notification to one or more other users indicating that the given on-site item has now been created. The function of handling the given data record in accordance with an approved status may take various other forms as well.

Once the data records generated by back-end platform 103 for the on-site items have been approved and made available to the full universe of users that generally have access to data records of this type, such users may then interact with those data records to manage and resolve the on-site items as appropriate.

In some implementations, after back-end platform 103 receives user input related to the data records generated by back-end platform 103, back-end platform 103 may also be configured to use at least some of that user input as a basis for updating the machine learning models being executed by back-end platform 103 during the extraction operation. For example, after a data record generated by back-end platform 103 has been reviewed, edited, and approved by a user, back-end platform 103 may designate that data record for future use as training data for at least some of the machine learning models being executed by back-end platform 103 during the extraction operation, and once back-end platform 103 has compiled enough new data records, back-end platform 103 may then use such data records to re-train the machine learning models.

The disclosed software technology may facilitate various other functionality related to documenting and managing on-site items as well.

While the functionality of the disclosed software technology has been described in the context of a SaaS application in which the disclosed capture software component is run by a client station, the disclosed processing software component is run by a back-end platform, and the disclosed review software component is run by a client station (which may either be the same as the client station running the capture software component or different from that client station), as noted above, it should be understood that the disclosed software technology may alternatively be embodied in the form of a single, native application to be installed on a client station of a user that comprises each of the capture, processing, and review software components disclosed herein. For instance, in one such alternative implementation, client station 101 may be configured to carry out each of the functions described above with reference to blocks 401-410 (except for the client station-to-platform communication functions, which may be unnecessary in this implementation), and once the data records generated by client station 101 in accordance with the foregoing functionality are designated as approved, such data records could then be communicated to back-end platform 103 via communication network 104, which may in turn handle such data records in accordance with this approved status as described above. The functionality of the disclosed software technology may be distributed between one or more client stations and a back-end platform (and/or other devices or systems) in other manners as well.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "users" or other entities, this is for purposes of example and explanation only. Claims should not be construed as requiring action by such actors unless explicitly recited in claim language.

The invention claimed is:

1. A computing system comprising:
a communication interface that is configured to facilitate communication via one or more communication networks;
at least one processor;
a non-transitory computer-readable medium; and
program instructions stored on the non-transitory computer-readable medium that are executable by the at least one processor such that the computing system is capable of:
analyzing media content captured at a construction site that is descriptive of at least one given on-site item identified by a user while at the construction site;
based on the analyzing, extracting, from the captured media content, a set of information for the given on-site item;
based on the extracted set of information for the given on-site item, generating an editable data record for the given on-site item, wherein the editable data record includes data representing at least a portion of the extracted set of information; and
causing the editable data record for the given on-site item to be presented to the user for review.

2. The computing system of claim 1, further comprising program instructions stored on the non-transitory computer-readable medium that are executable by the at least one processor such that the computing system is capable of:
after causing the editable data record for the given on-site item to be presented to the user for review, receiving user input related to the editable data record; and
updating the editable data record in accordance with the received user input.

3. The computing system of claim 2, wherein the received user input related to the editable data record comprises one or both of a requested edit to the editable data record or an indication that the user has approved the editable data record.

4. The computing system of claim 1, wherein the captured media content comprises one of an audio recording or an audiovisual recording that is descriptive of the given on-site item.

5. The computing system of claim 1, wherein analyzing the captured media content comprises:
translating the captured media content into text that describes the given on-site item; and
performing an analysis of the text translation.

6. The computing system of claim 5, wherein translating the captured media content into text that describes the given on-site item comprises one or both of (i) using speech recognition to transcribe audio data included in the captured media content into text that describes the given on-site item or (ii) using image recognition to identify one or more objects within video data included in the captured media content and then generating text that describes the identified one or more objects.

7. The computing system of claim 5, wherein the analysis of the text translation comprises one or more of dependency parsing, text summarization, name recognition, or text classification.

8. The computing system of claim 1, wherein the extracted set of information for the given on-site item comprises one or more of a description of the given on-site item, a title of the given on-site item, a categorization of the given on-site item, an individual responsible for the given on-site item, or a location of the given on-site item.

9. The computing system of claim 1, wherein the captured media content is supplemented with location information for the given on-site item.

10. The computing system of claim 1, wherein causing the editable data record for the given on-site item to be presented to the user for review comprises:
transmitting the editable data record to a client station via a communication network and thereby causing the client station to present the editable data record to the user.

11. A non-transitory computer-readable medium, wherein the non-transitory computer-readable medium is provisioned with program instructions that are executable by at least one processor of a computing system such that the computing system is capable of:
analyzing media content captured at a construction site that is descriptive of at least one given on-site item identified by a user while at the construction site;
based on the analyzing, extracting, from the captured media content, a set of information for the given on-site item;
based on the extracted set of information for the given on-site item, generating an editable data record for the given on-site item, wherein the editable data record includes data representing at least a portion of the extracted set of information; and
causing the editable data record for the given on-site item to be presented to the user for review.

12. The non-transitory computer-readable medium of claim 11, wherein the non-transitory computer-readable medium is further provisioned with program instructions that are executable by the at least one processor of the computing system such that the computing system is capable of:
after causing the editable data record for the given on-site item to be presented to the user for review, receiving user input related to the editable data record; and
updating the editable data record in accordance with the received user input.

13. The non-transitory computer-readable medium of claim 12, wherein the received user input related to the editable data record comprises one or both of a requested edit to the editable data record or an indication that the user has approved the editable data record.

14. The non-transitory computer-readable medium of claim 11, wherein the captured media content comprises one of an audio recording or an audiovisual recording that is descriptive of the given on-site item.

15. The non-transitory computer-readable medium of claim 11, wherein analyzing the captured media content comprises:
translating the captured media content into text that describes the given on-site item; and
performing an analysis of the text translation.

16. The non-transitory computer-readable medium of claim 15, wherein translating the captured media content into text that describes the given on-site item comprises one or both of (i) using speech recognition to transcribe audio data included in the captured media content into text that describes the given on-site item or (ii) using image recognition to identify one or more objects within video data included in the captured media content and then generating text that describes the identified one or more objects.

17. The non-transitory computer-readable medium of claim 11, wherein the extracted set of information for the given on-site item comprises one or more of a description of the given on-site item, a title of the given on-site item, a categorization of the given on-site item, an individual responsible for the given on-site item, or a location of the given on-site item.

18. A computer-implemented method comprising:
- analyzing media content captured at a construction site that is descriptive of at least one given on-site item identified by a user while at the construction site;
- based on the analyzing, extracting, from the captured media content, a set of information for the given on-site item;
- based on the extracted set of information for the given on-site item, generating an editable data record for the given on-site item, wherein the editable data record includes data representing at least a portion of the extracted set of information; and
- causing the editable data record for the given on-site item to be presented to the user for review.

19. The computer-implemented method of claim 18, further comprising:
- after causing the editable data record for the given on-site item to be presented to the user for review, receiving user input related to the editable data record; and
- updating the editable data record in accordance with the received user input.

20. The computer-implemented method of claim 18, wherein the captured media content comprises one of an audio recording or an audiovisual recording that is descriptive of the given on-site item.

* * * * *